United States Patent
Wu et al.

(10) Patent No.: US 10,804,818 B2
(45) Date of Patent: Oct. 13, 2020

(54) TRIBOELECTRIC GENERATOR AND NETWORK FOR MECHANICAL ENERGY HARVESTING

(71) Applicant: Toyota Motor Engineering & Manufacturing North America, Inc., Erlanger, KY (US)

(72) Inventors: Songtao Wu, Ann Arbor, MI (US); Khoa Vo, Superior Township, MI (US); Chi-Ming Wang, Ann Arbor, MI (US); Debasish Banerjee, Ann Arbor, MI (US); Ercan Mehmet Dede, Ann Arbor, MI (US); Shailesh Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 595 days.

(21) Appl. No.: 15/639,739

(22) Filed: Jun. 30, 2017

(65) Prior Publication Data
US 2019/0006961 A1    Jan. 3, 2019

(51) Int. Cl.
*H02N 1/04*       (2006.01)
*H02N 2/18*       (2006.01)
*H02N 1/00*       (2006.01)

(52) U.S. Cl.
CPC ..................... *H02N 1/04* (2013.01)

(58) Field of Classification Search
CPC .................. H02N 1/04; H02N 2/18
See application file for complete search history.

(56) References Cited

U.S. PATENT DOCUMENTS

| 6,349,141 B1 * | 2/2002 | Corsaro ............... H04R 17/00 310/311 |
| 7,336,022 B2 * | 2/2008 | Schuh ................. H01L 41/0926 310/317 |

(Continued)

FOREIGN PATENT DOCUMENTS

| CN | 204156752 U | 2/2015 | |
| EP | 3010138 A1 * | 4/2016 | ............... H04N 1/04 |
| WO | WO-2014198155 A1 * | 12/2014 | ............... H02N 1/04 |

OTHER PUBLICATIONS

Von Buren et al., "Optimization of Inertial Micropower Generators for Human Walking Motion", IEEE Sensors Journal, vol. 6, No. 1, Feb. 2006, (11 pages).

(Continued)

*Primary Examiner* — Edgardo San Martin
(74) *Attorney, Agent, or Firm* — Christopher G. Darrow; Darrow Mustafa PC

(57) ABSTRACT

A triboelectric generator includes a resiliently-deformable hexagonal housing including a first housing wall and a second housing wall positioned opposite the first housing wall. A first electrode resides along the first housing wall, and a second electrode resides along the second housing wall. A dielectric contact layer is positioned in intimate contact with the first electrode and between the first electrode and the second electrode. The dielectric contact layer is spaced apart from the second housing wall. The first housing wall is coupled to the second housing wall such that at least one of the first housing wall and the second housing wall is resiliently movable toward the other one of the first housing wall and the second housing wall so as to enable contact between the dielectric contact layer and the second electrode during operation of the triboelectric generator.

15 Claims, 11 Drawing Sheets

(56) References Cited

U.S. PATENT DOCUMENTS

| | | | | |
|---|---|---|---|---|
| 8,379,888 | B2* | 2/2013 | Lee | H04R 17/005 |
| | | | | 381/116 |
| 9,178,446 | B2* | 11/2015 | Wang | H02N 1/04 |
| 9,595,894 | B2* | 3/2017 | Wang | H02N 1/04 |
| 9,790,928 | B2* | 10/2017 | Wang | G01L 1/005 |
| 9,825,557 | B2* | 11/2017 | Wang | H02N 1/04 |
| 9,825,558 | B2* | 11/2017 | Zhang | H02N 1/04 |
| 9,837,934 | B2* | 12/2017 | Kim | H02N 1/04 |
| 9,929,678 | B2* | 3/2018 | Kim | H02N 1/04 |
| 10,199,958 | B2* | 2/2019 | Shin | H02N 1/04 |
| 10,298,150 | B2* | 5/2019 | Otagiri | H02N 1/04 |
| 2011/0291526 | A1* | 12/2011 | Abramovich | H01L 41/0835 |
| | | | | 310/339 |
| 2012/0321383 | A1* | 12/2012 | Sieger | E01C 5/00 |
| | | | | 404/71 |
| 2013/0049531 | A1 | 2/2013 | Wang et al. | |
| 2013/0269742 | A1* | 10/2013 | Pingree | H01L 35/32 |
| | | | | 136/205 |
| 2014/0338458 | A1* | 11/2014 | Wang | G01L 1/005 |
| | | | | 73/658 |
| 2015/0001993 | A1* | 1/2015 | Park | H01L 41/113 |
| | | | | 310/319 |
| 2015/0318800 | A1 | 11/2015 | Zhang et al. | |
| 2016/0156282 | A1 | 6/2016 | Kim et al. | |
| 2016/0336505 | A1* | 11/2016 | Arizumi | H01L 41/113 |
| 2017/0005258 | A1* | 1/2017 | Kim | H01L 41/113 |
| 2017/0170749 | A1* | 6/2017 | Arizumi | H02N 1/04 |
| 2018/0062543 | A1* | 3/2018 | Jung | H02N 1/04 |
| 2018/0145244 | A1* | 5/2018 | Otagiri | G01L 5/226 |
| 2018/0191274 | A1* | 7/2018 | Arulandu | H02N 1/04 |
| 2018/0205327 | A1* | 7/2018 | Wu | B60C 19/00 |
| 2018/0355840 | A1* | 12/2018 | Hsu | H01L 41/1138 |

OTHER PUBLICATIONS

Li et al., "Energy-Harvesting Shock Absorber with a Mechanical Motion Rectifier", Department of Mechanical Engineering, State University of New York on Stony Brook, Stony Brook, NY, 2013, (15 pages).
Beeby et al., "A micro electromagnetic generator for vibration energy harvesting", Journal of Micromechanics and Microengineering, 2007, pp. 1257-1265 (9 pages).
Sodano et al., "Comparison of Piezoelectric Energy Harvesting Devices for Recharging Batteries", Journal of Intelligent Material Systems and Structures, 2005, (21 pages).
Wang et al., "Piezoelectric Nanogenerators Based on Zinc Oxide Nanowire Arrays", Science Magazine, vol. 312, Apr. 14, 2006, (5 pages).
Shenck et al., "Energy Scavenging with Shoe-Mounted Piezoelectrics", IEEE, 2001, (13 pages).
Pelrine et al., "Dielectric Elastomers: Generator Mode Fundamentals and Applications", SPIE, vol. 4329, 2001, (9 pages).
Koh et al., "Maximal energy that can be converted by a dielectric elastomer generator", American Institute of Physics, 2009 (3 pages).
Bai et al., "Integrated Multilayered Triboelectric Nanogenerator for Harvesting Biomechanical Energy from Human Motions", American Chemical Society, accepted Mar. 13, 2013, (7 pages).
Chen et al., "Harmonic-Resonator-Based Triboelectric Nanogenerator as a Sustainable Power Source and a Self-Powered Active Vibration Sensor", 2013, (6 pages).
Yang et al., "3D Stack Integrated Triboelectric Nanogenerator for Harvesting Vibration Energy", 2014, (7 pages).
Xie et al., "Multi-layered disk triboelectric nanogenerator for harvesting hydropower", Elsevier, 2014, (8 pages).
Hou et al., "Triboelectric nanogenerator built inside shoe insole for harvesting walking energy", Elsevier, 2013, (7 pages).
Zhang et al., "High-performance triboelectric nanogenerator with enhanced energy density based on single-step fluorocarbon plasma treatment", Elsevier, 2014, (10 pages).
Wang et al., "Triboelectric nanogenerators as self-powered active sensors", Elsevier, 2015, (27 pages).
Zhang et al., "High performance triboelectric nanogenerators based on large-scale mass-fabrication technologies", Elsevier, 2015, (19 pages).
Zhu et al., "Self-Powered, Ultrasensitive, Flexible Tactile Sensors Based on Contact Electrification", ResearchGate, May 2014, (7 pages).
Ha et al., "Triboelectric Generators and Sensors for Self-Powered Wearable Electronics", ResearchGate, Mar. 2015, (8 apges).
Gao et al., "Electrochemical Oxidation Degradation of Azobenzene Dye Self-powered by Multilayer-Linkage Triboelectric Nanogenerator", Author's Accepted Manuscript, Nano Energy, Accepted Sep. 11, 2016, 18 pages.
Wang et al., "Self-Powered High-Resolution and Pressure-Sensitive Triboelectric Sensor Matrix for Real-time Tactile Mapping", 2016, (8 pages).
Xia et al., "Honeycomb-like three electrodes based triboelectric generator for harvesting energy in full space and as a self-powered vibration alertor", Elsevier, 2015, (10 pages).

* cited by examiner

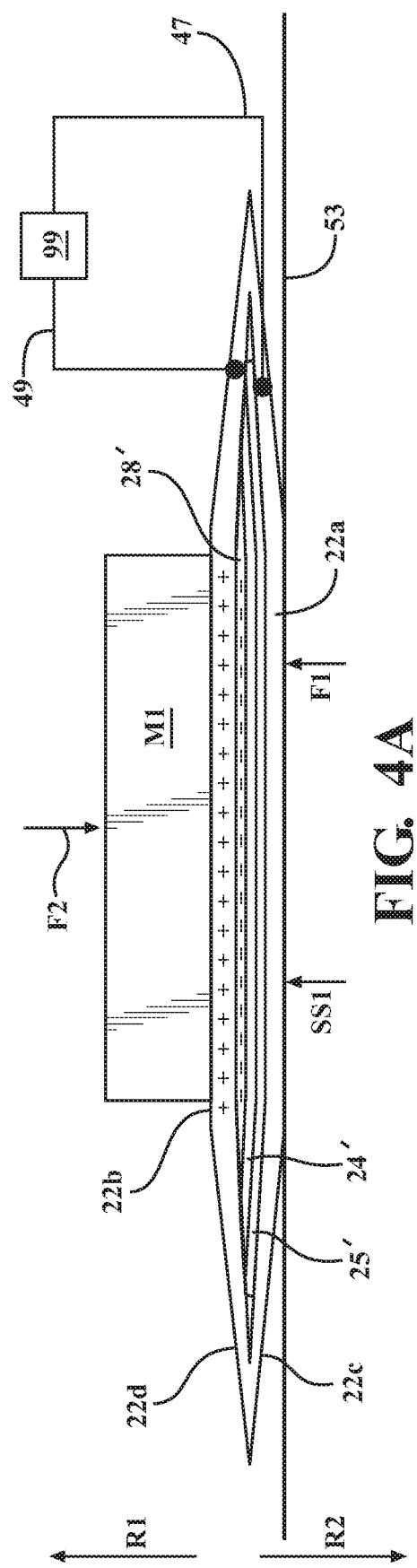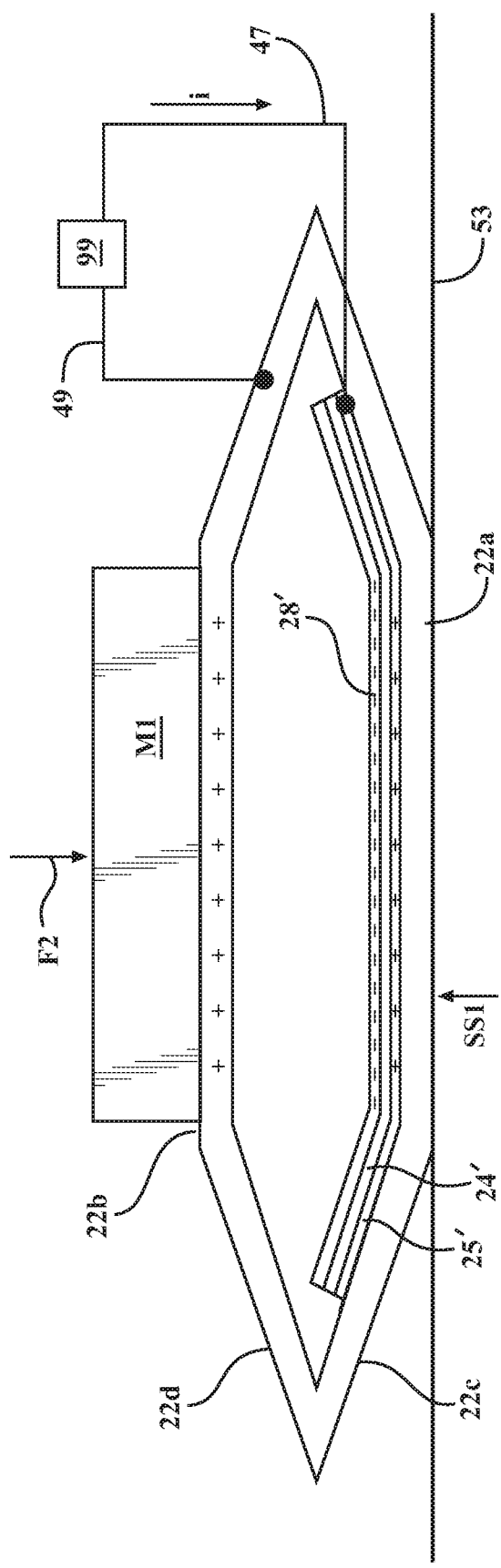

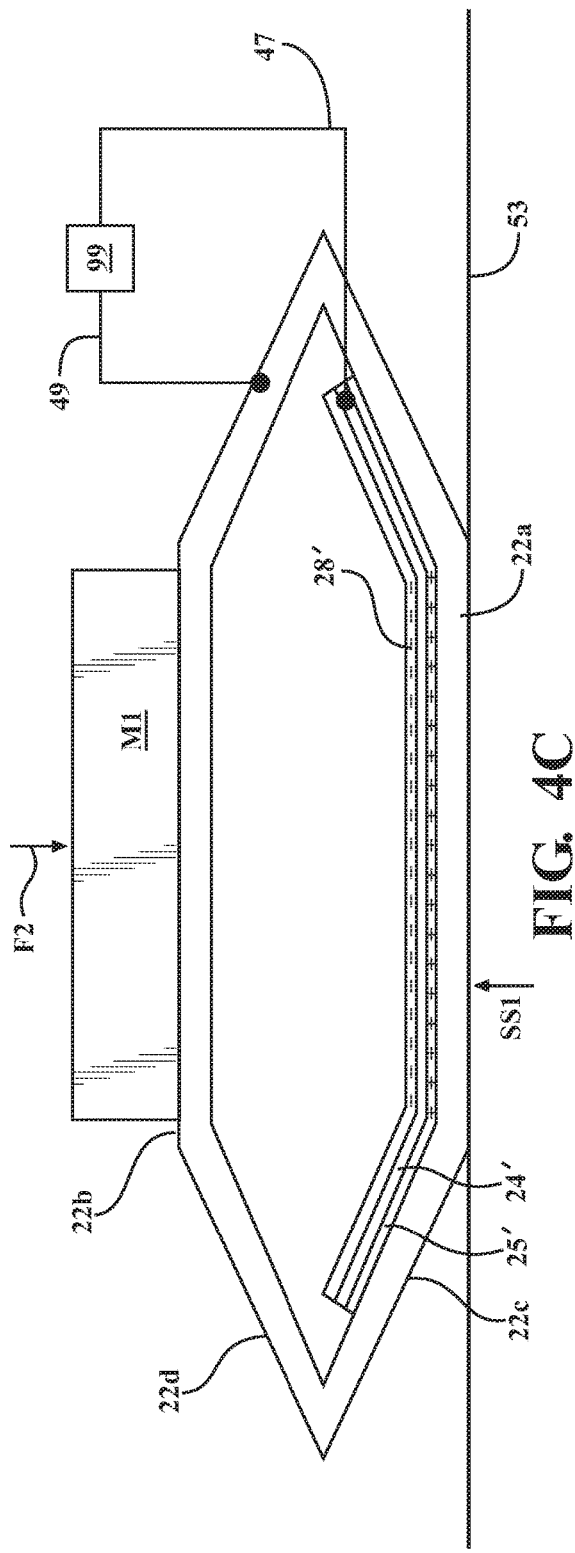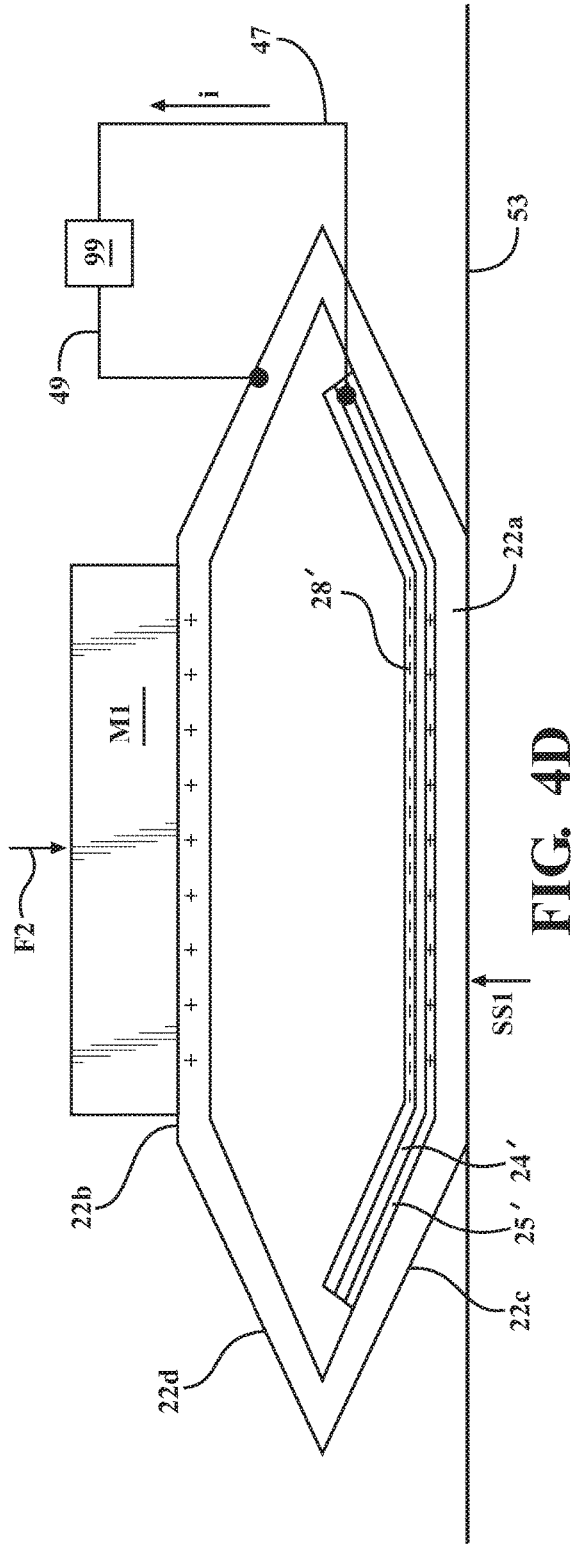

| Parameter | Value | Unit |
|---|---|---|
| Frequency | 10 | [Hz] |
| Displacement (peak-to-peak) | 2.5 | [mm] |
| Velocity (peak) | 78.5 | [mm/s] |
| Acceleration (peak) | 0.50 | [g] |

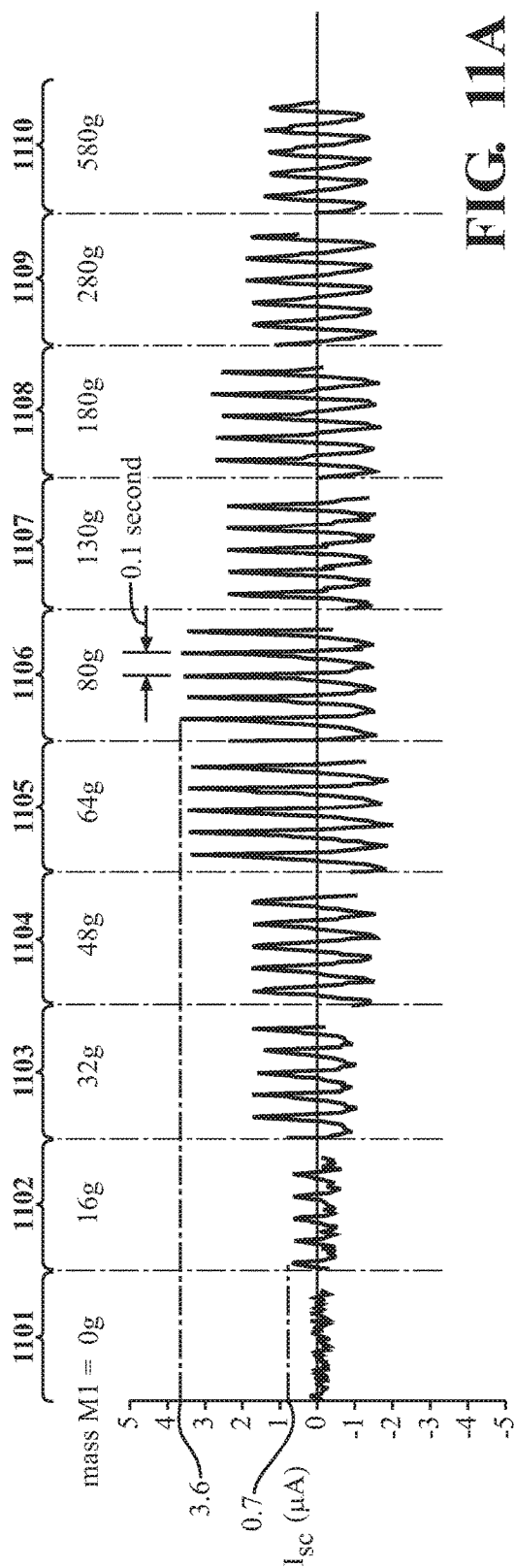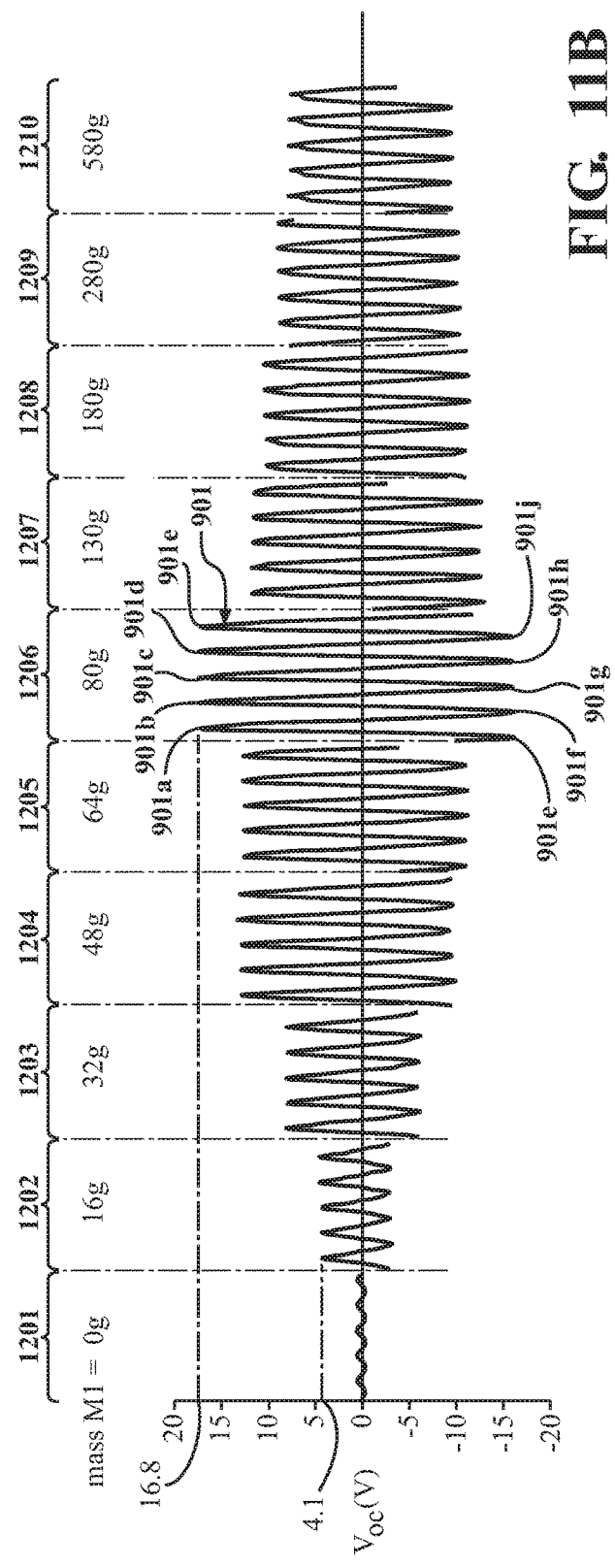

US 10,804,818 B2

TRIBOELECTRIC GENERATOR AND NETWORK FOR MECHANICAL ENERGY HARVESTING

TECHNICAL FIELD

The present invention relates to generators and, more specifically, to a system for generating voltage and current using the triboelectric effect.

BACKGROUND

A generator using the triboelectric principle converts external mechanical energy into electricity by a combination of contact-electrification and electrostatic induction. Contact electrification takes place when certain materials with opposite triboelectric polarities become electrically charged after they come into contact with each other. The separation of these materials with opposite triboelectric polarities may drive separated electrons between electrodes of the triboelectric generator.

An ongoing challenge in power generating devices utilizing the triboelectric principle is improving the power density of the generator (i.e., the power generated per unit volume occupied by the generator structure). Another ongoing challenge relating to practical applications of triboelectric generators involves impedance matching and power management of generated voltages and currents which may be characterized by waveforms having sharp pulses of peaks. Such output waveforms may be difficult to process for purposes of impedance matching and power management, and may also provide a very low average power, or a very low ratio (R) of average power to instantaneous power.

SUMMARY

In one aspect of the embodiments described herein, a triboelectric generator is provided. The generator includes a resiliently-deformable hexagonal housing including a first housing wall and a second housing wall positioned opposite the first housing wall. A first electrode resides along the first housing wall, and a second electrode resides along the second housing wall. A dielectric contact layer is positioned in intimate contact with the first electrode and between the first electrode and the second electrode. The dielectric contact layer is spaced apart from the second housing wall. The first housing wall is coupled to the second housing wall such that at least one of the first housing wall and the second housing wall is resiliently movable toward the other one of the first housing wall and the second housing wall so as to enable contact between the dielectric contact layer and the second electrode during operation of the triboelectric generator.

In another aspect of the embodiments described herein, a power generating system is provided. The power generating system includes a plurality of contiguous hexagonal triboelectric generators.

In another aspect of the embodiments described herein, a triboelectric generator is provided. The generator includes an electrically-conductive hexagonal housing having a first housing wall and a second housing wall positioned opposite the first housing wall. The second housing wall forms an electrode of the triboelectric generator. Another electrode is positioned along the first housing wall. A dielectric contact layer is positioned in intimate contact with the other electrode and between the other electrode and the second housing wall. The dielectric contact layer is spaced apart from the second electrode. The housing is structured to be resiliently-deformable responsive to relative movement between the first housing wall and the second housing wall, so as to enable contact between the dielectric contact layer and the second housing wall for operation of the triboelectric generator.

BRIEF DESCRIPTION OF THE DRAWINGS

FIGS. 4A-4D is a series of schematic views showing operation of a triboelectric generator as shown in FIG. 3.

FIG. 11A is a schematic view showing output waveforms for short circuit current for various test masses applied to the triboelectric generator test network responsive to the input force described in FIGS. 9 and 10.

FIG. 11B is a schematic view showing output waveforms for open circuit voltage for various test masses applied to the triboelectric generator test network responsive to the input force described in FIGS. 9 and 10.

DETAILED DESCRIPTION

Embodiments described herein relate to a triboelectric generator. The generator may include a resiliently-deformable hexagonal housing including a first housing wall and a second housing wall positioned opposite the first housing wall. A first electrode is positioned along the first housing wall, and a second electrode is positioned along the second housing wall. A dielectric contact layer is positioned in intimate contact with the first electrode, between the first electrode and the second electrode, and spaced apart from the second housing wall. The first housing wall is coupled to the second housing wall such that at least one of the first housing wall and the second housing wall is resiliently movable toward the other one of the first housing wall and the second housing wall so as to enable contact between the dielectric contact layer and the second electrode during operation of the triboelectric generator. The hexagonal shape of the housing enables a volume-efficient arrangement of housings for use in a network of triboelectric generators. Mechanical properties of the hexagonal housing may also enable a spacing between the first and second electrodes to be adjusted as desired for a particular application. As described herein, it has been found that the use of a hexagonal housing shape for triboelectric generators may provide numerous advantages with regard to power density management, output power management, scalability, design flexibility, and fabrication flexibility.

Figure 1:
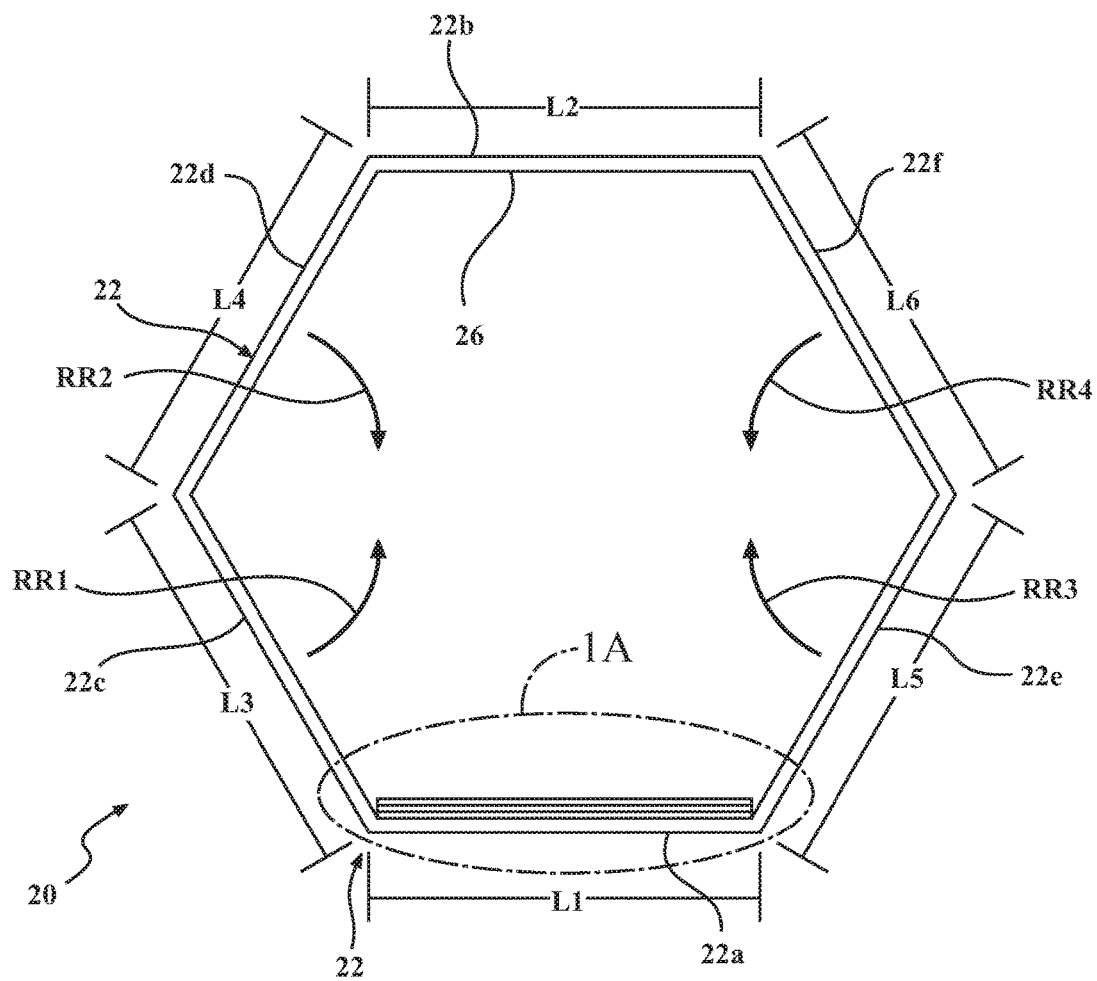
FIG. 1 is a schematic end view of a hexagonal triboelectric generator in accordance with an embodiment described herein.
Figure 1A:
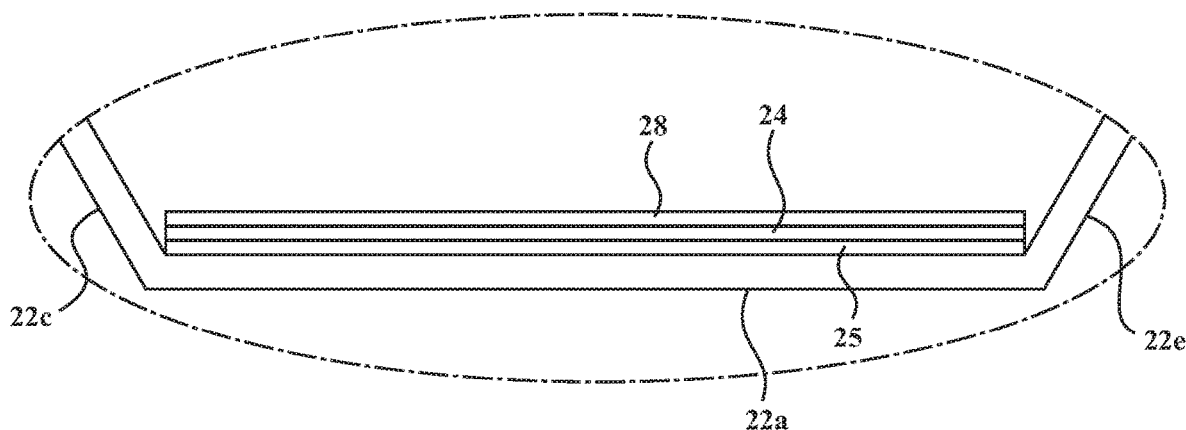
FIG. 1A is a magnified view of a portion of the generator shown in FIG. 1.

FIG. 1 is a schematic end view of a triboelectric generator 20 in accordance with one or more arrangements described herein. FIG. 1A is a magnified view of a portion of the generator shown in FIG. 1. In the embodiment shown in FIGS. 1 and 1A, generator 20 includes a resiliently-deformable hexagonal housing, generally designated 22. Due to its hexagonal shape, the housing 22 has six sides or walls 22a, 22b, 22c, 22d, 22e, and 22f and six included angles formed at intersections between the walls. Two or more of the walls may have equal lengths.

The term "resiliently-deformable" as applied to the housing embodiments described herein means that the housing or a portion thereof may be deformed responsive to application of a force or load to the housing during operation of the triboelectric generator to generate a flow of current, without experiencing plastic or permanent deformation due to the loading. For example, a given housing may be designed and/or fabricated to be resiliently-deformable responsive to application of a force within a predetermined range of forces. In addition, when deflected or deformed from a first, relatively lower-stress configuration to a second, relatively higher-stress configuration, a resiliently-deformable housing or portion of a housing will have a tendency to return to the first, relatively lower-stress configuration when the force causing the change in configuration is removed.

Housing 22 may include a first housing wall 22a and a second housing wall 22b positioned opposite and spaced apart from the first housing wall 22a. Walls 22c-22f may form sidewalls of the housing 22. A third housing wall 22c may be coupled to the first housing wall 22a so as to enable resilient angular rotation of the third housing wall 22c with respect to the first housing wall 22a. A fourth housing wall 22d may be coupled to the second housing wall 22b so as to enable resilient angular rotation of the fourth housing wall 22d with respect to the second housing wall 22b.

In addition, the third housing wall 22c may be structured and secured with respect to the fourth housing wall 22d such that movement of the first housing wall 22a in a direction toward the second housing wall 22b causes the third housing wall 22c to resiliently rotate with respect to the fourth housing wall in a direction toward the fourth housing wall 22d, as indicated by arrow RR1. Also, the fourth housing wall 22d may be structured and secured with respect to the third housing wall 22c such that movement of the second housing wall 22b in a direction toward the first housing wall 22a causes the fourth housing wall 22d to resiliently rotate with respect to the third housing wall in a direction toward the third housing wall 22c, as indicated by arrow RR2.

Also, a fifth housing wall 22e may be coupled to the first housing wall 22a so as to enable resilient angular rotation of the fifth housing wall 22e with respect to the first housing wall 22a. A sixth housing wall 22f may be coupled to the second housing wall 22b so as to enable resilient angular rotation of the sixth housing wall 22f with respect to the second housing wall 22b. In addition, the fifth housing wall 22e may be structured and secured with respect to the sixth housing wall 22f such that movement of the first housing wall 22a in a direction toward of the second housing wall 22b causes the fifth housing wall 22e to resiliently rotate with respect to the sixth housing wall in a direction toward the sixth housing wall 22f, as indicated by arrow RR3. Also, the sixth housing wall 22f may be structured and secured with respect to the fifth housing wall 22e such that movement of the second housing wall 22b in a direction toward the first housing wall 22a causes the sixth housing wall 22f to resiliently rotate with respect to the fifth housing wall in a direction toward the fifth housing wall 22e, as indicated by arrow RR4.

"Resilient angular rotation" or "resilient rotation" of a portion of a housing refers to angular rotation responsive to an applied load (or change in loading) which resiliently changes an angular orientation of the rotated part with respect to another part during operation of the triboelectric generator to generate a flow of current, and without the rotated portion of the housing experiencing plastic or permanent deformation due to the loading. For example, referring to FIG. 1, the third housing wall 22c may be coupled to the first housing wall 22a so as to enable resilient angular rotation of the third housing wall 22c with respect to the first housing wall 22a responsive to an applied load (or change in loading), thereby changing the angle formed between the first housing wall 22a and the third housing wall 22c. In addition, when rotated from a first, relatively lower-stress angular orientation to a second, relatively higher stress angular orientation, the rotated portion of the housing will have a tendency to return to the first, relatively lower-stress angular orientation when the force prompting the change in angular orientation is removed.

In any of the embodiments described herein, the various walls of a given housing may have equal wall thicknesses, or the wall thicknesses may vary according to design or fabrication requirements. In one or more arrangements, the third, fourth, fifth, and sixth housing walls 22c-22f of FIG. 1 have equal wall thicknesses.

The first housing wall 22a may have a first length L1, and the second housing wall 22b may have a second length L2. The third housing wall 22c may have a third length L3, and the fourth housing wall 22d may have a fourth length L4. The fifth housing wall 22e may have a fifth length L5, and the sixth housing wall 22f may have a sixth length L6. In one or more arrangements, all of the housing walls L1-L6 have equal lengths. The housing walls may be formed from any suitable material or materials. In one or more arrangements, the housing walls are formed from a metallic material, for example, aluminum.

Figure 6A:
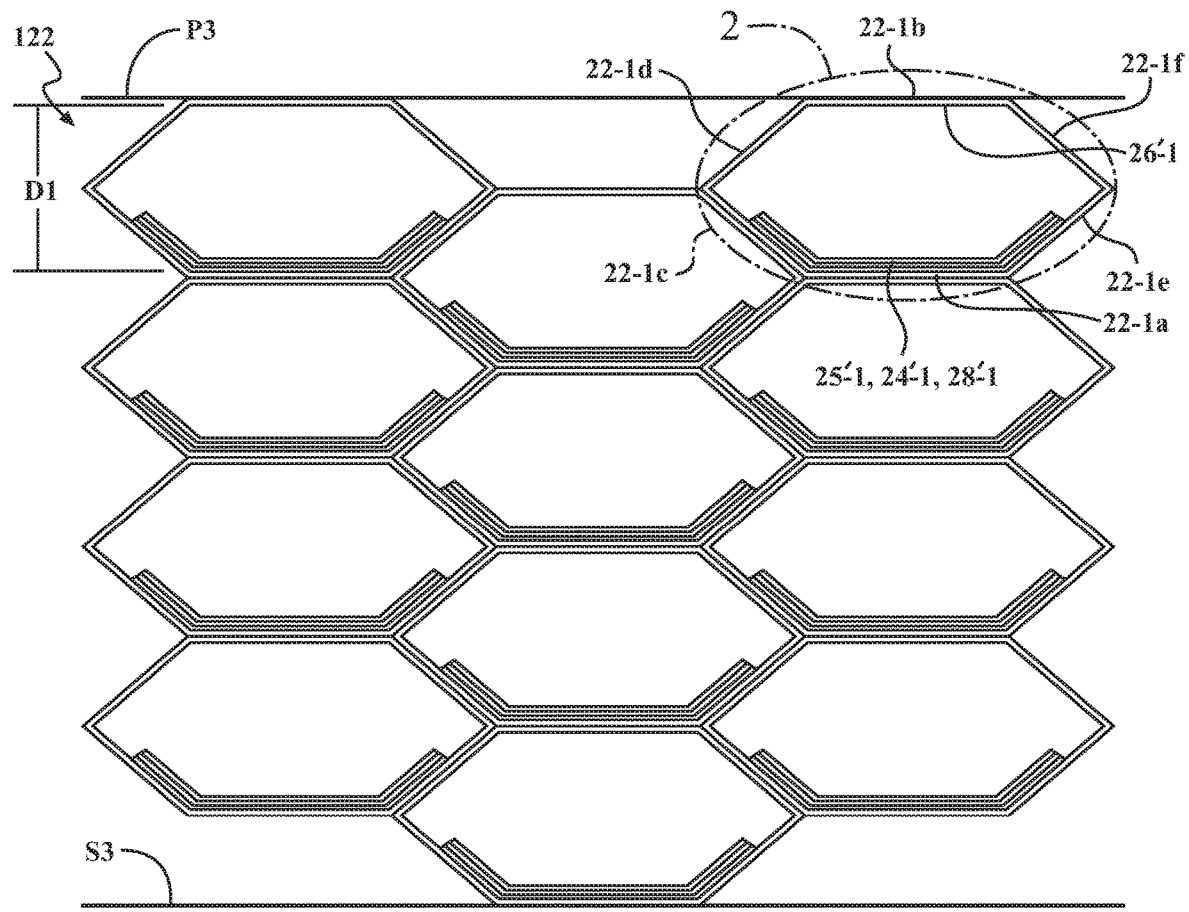
FIG. 6A is a schematic end view of a hexagonal triboelectric generator network in accordance with an embodiment described herein, prior to pre-compression.
Figure 6B:
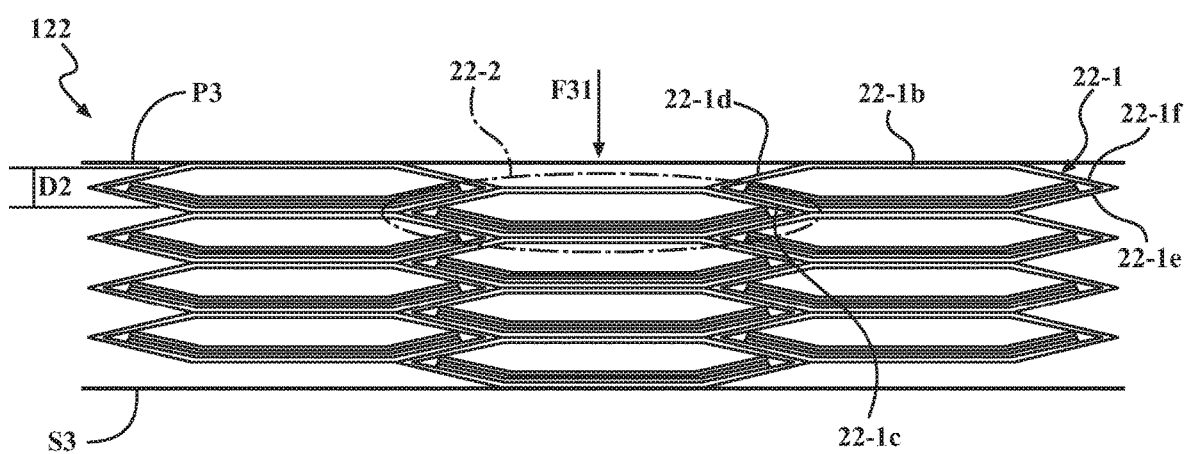
FIG. 6B is a schematic end view of the network shown in FIG. 6A, after pre-compression.
Figure 6C:
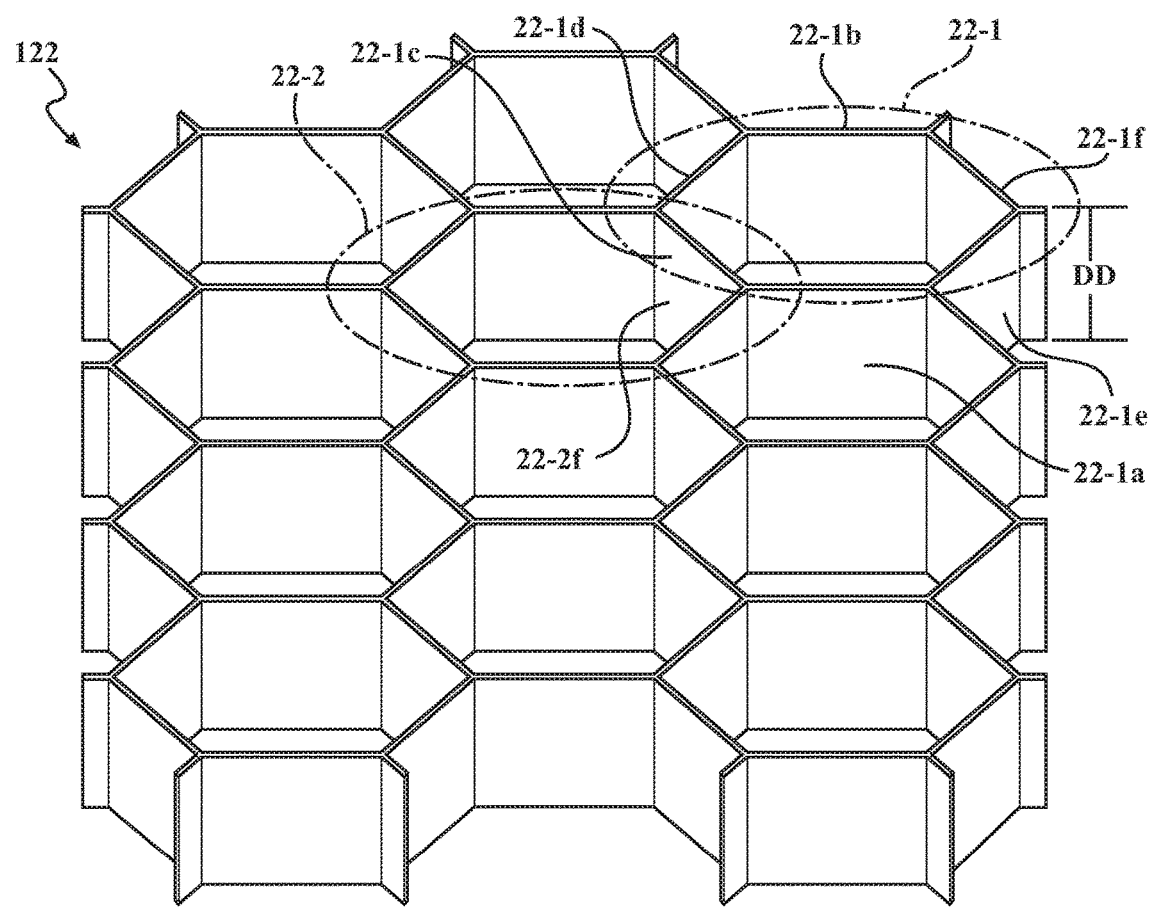
FIG. 6C is a schematic perspective view of the hexagonal triboelectric generator network shown in FIG. 6A, prior to pre-compression.

Each of the housing walls may also have an associated depth dimension DD (extending perpendicular to a plane of the drawing in FIG. 1)(an example of which is shown in FIG. 6C) which may be specified according to the requirements of a particular application. In one or more arrangements, all of the walls 22a-22f in a housing may have equal depth dimensions. Also, in one or more arrangements, all of the housing walls in a bank or network of housings incorporated into a network comprising multiple triboelectric generators may have equal depth dimensions.

The length of a particular housing wall and the depth dimension of the wall may combine to determine a surface area of the wall which may be available for mounting of electrodes and dielectric contact layers thereto. The contact surface area between electrodes and dielectric contact layers in a given triboelectric generator may affect the power density achievable by the triboelectric generator. In addition, for increasing power density in a bank or network comprising multiple hexagonal triboelectric generators which are interconnected to increase power generation, it may be beneficial to maximize the electrode/dielectric contact layer contact surface area per unit volume of the network, to make the most efficient use of the space occupied by the network.

Referring again to FIGS. 1 and 1A, in one or more arrangements, a first conductive layer (or first electrode) 24 may reside along the first housing wall 22a. First electrode 24 may be formed from any suitable conductive material, for example, a metallic material such as gold, copper, or aluminum, or from a material such as a conductive polymer. In the embodiment shown in FIG. 1, first electrode 24 is formed from gold. First electrode 24 may be secured to first housing wall 22a using any suitable method (for example, a double-sided tape 25 as shown in FIGS. 1 and 1A). The securement method may also serve to electrically insulate the electrode 24 from the conductive housing 22.

A second conductive layer (or second electrode) 26 may reside along the second housing wall 22b and may face in a direction toward the first housing wall 22a. Second electrode 26 may include (or be formed from) an electrically conductive metal layer (which could include a material such as aluminum, another metal or a conductive polymer) that has a triboelectric series rating indicating a propensity to lose electrons when contacted by the dielectric contact layer 28 (described in greater detail below).

In one or more arrangements, at least a portion of the second electrode 26 is formed from a metallic material (for example, aluminum) which forms the second housing wall 22b. In one or more arrangements, wall 22b forms the electrode or a portion of the electrode. Also, in one or more arrangements described herein, portions of the fourth housing wall 22d and the sixth housing wall 22f may also form portions of the second electrode 26.

In addition, a dielectric contact layer 28 may be positioned in intimate contact with the first electrode 24 and between the first electrode 24 and the second electrode 26. The dielectric contact layer 28 may be spaced apart from the second housing wall 22b. Dielectric contact layer 28 may be formed from, for example, PDMS, PTFE, FEP, PVC, a Polyimide, or any material that has a triboelectric series rating indicating a propensity to gain electrons due to a contacting event. In particular embodiments, dielectric contact layer 28 is formed from PTFE (polytetrafluoroethylene). The dielectric contact layer 28 may be positioned spaced apart from and opposite the conductive second electrode 26 so as to enable contact with the second electrode 26 during operation of the triboelectric generator as described herein. In one or more arrangements, the dielectric contact layer 28 is in the form of a commercially available aluminum-coated PTFE thin film which may be applied directly onto the first electrode 24 with adhesive tape. In one or more arrangements, the PTFE film surface may be further modified using a known inductively coupled plasma reactive ion etching technique to obtain a nanorod surface.

In one or more arrangements, the first housing wall 22a is coupled to the second housing wall 22b by the third, fourth, fifth, and sixth housing walls 22c, 22d, 22e, and 22f, respectively, such that at least one of the first housing wall 22a and the second housing wall 22b is resiliently movable toward the other one of the first housing wall 22a and the second housing wall 22b, so as to enable contact between the dielectric contact layer 28 and the second electrode 26 during operation of the triboelectric generator 20.

"Resiliently movable" means that the hexagonal housing 22 is structured to permit, responsive to application of a load (or a change in an existing loading condition) at least one of the separated first and second housing walls 22a and 22b to move in a direction toward the other one of the first housing wall and the second housing wall so as to enable contact between the dielectric contact layer 28 and the second electrode 26 during operation of the generator, without the housing experiencing plastic deformation due to the applied load or change in loading. In addition, the hexagonal housing is structured so that the first and second housing walls 22a and 22b will tend to move in directions away from each other in the absence of a force which forces them toward each other. Thus, in the embodiments shown herein, the third housing wall 22c, the fourth housing wall 22d, the fifth housing wall 22e, and the sixth housing wall 22f of the resiliently deformable housing 22 act as spring members resiliently connecting the first and second housing walls 22a and 22b, enabling controlled contact and disengagement between the dielectric contact layer 28 and the second electrode 26 for operation of the triboelectric generator 20.

The resiliently deformable hexagonal triboelectric generator housings and network structures described herein may resiliently deform responsive to a variety of loading conditions (including shock or impact loads), in a manner that operates the triboelectric generators incorporated into the structures. Stated another way, the hexagonal housing structures essentially act as spring members which incorporate one or more triboelectric generators therein, and which absorb applied loads and deform responsive to the applied loads in a manner that acts to operate the triboelectric generators.

Figure 2:
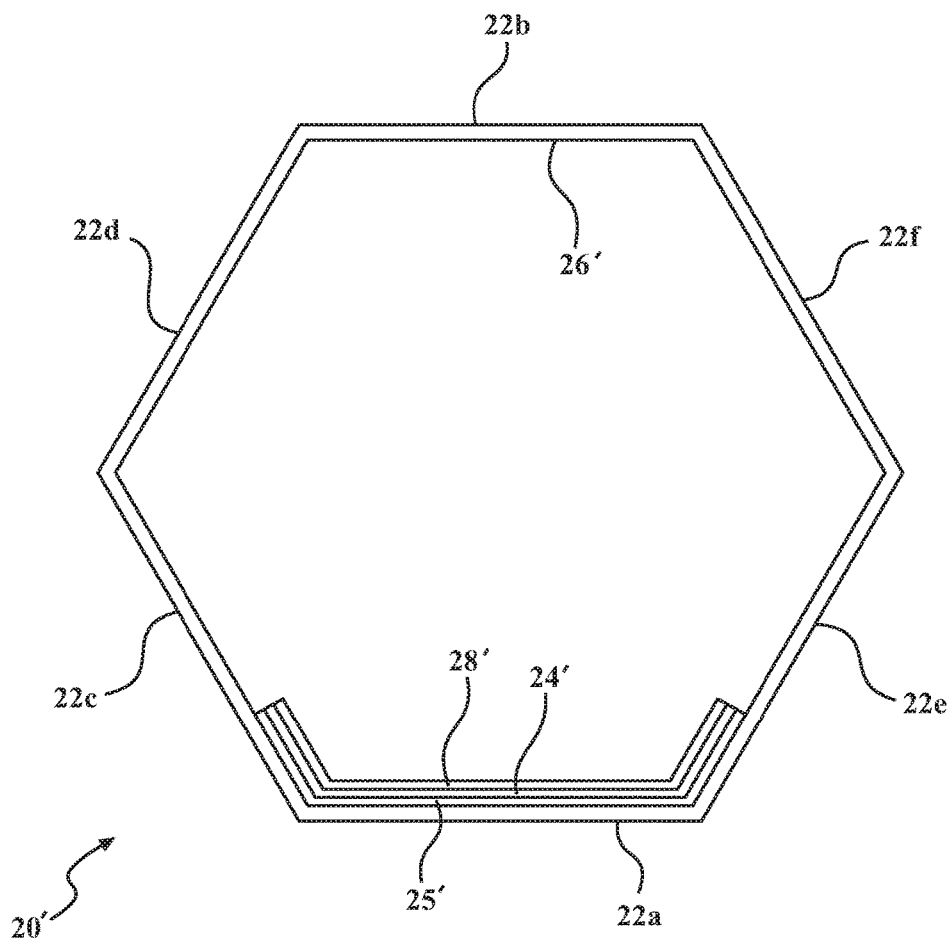
FIG. 2 is a schematic end view of a hexagonal triboelectric generator in accordance with another embodiment described herein.

FIG. 2 shows an alternative embodiment 20' of the triboelectric generator. The generator 20' may include a housing 22 structured as shown in FIGS. 1 and 1A. The first electrode 24' and the dielectric contact layer 28' may extend along a portion of at least one of the third housing wall 22c and the fifth housing wall 22e. In addition, an associated portion of the second electrode 26" may be formed by at least one of the fourth housing wall 22d and/or the sixth housing wall 22f, as well as by the second housing wall 22b. The dielectric contact layer 28' is then positioned to contact an associated at least one of the fourth housing wall 22d and the sixth housing wall 22f during operation of the triboelectric generator 20', as the walls 22c and 22d rotate toward each other and as the walls 22e and 22f rotate toward each other. This extension of the electrodes 24' and 26" and the dielectric contact layer 28' onto the walls 22c-22f provides an increase in the contact surface area, which may increase the power density of the triboelectric generator 20'. This aspect also provides design flexibility, enabling the contact surface area to be adjusted or tailored according to the requirements of a particular application.

Figure 3:
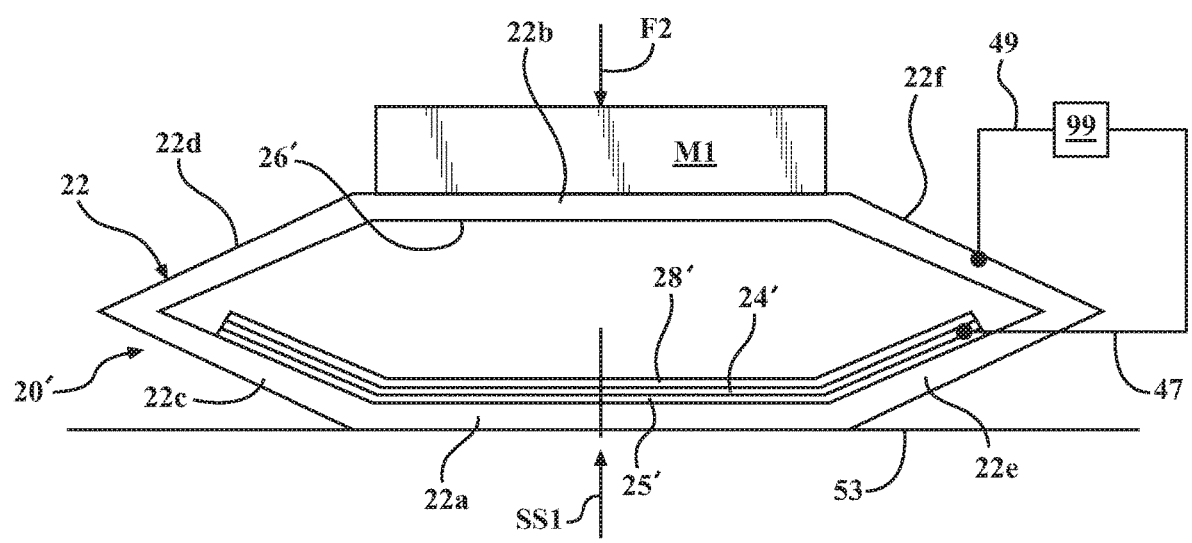
FIG. 3 is a schematic end view of a hexagonal triboelectric generator structured as shown in FIG. 2, in a first loaded condition and in static equilibrium.

FIGS. 3-4D are a series of schematic views showing operation of a triboelectric generator 20' as shown in FIG. 2. For purposes of illustration, in the embodiment shown in FIGS. 3-4D, housing 22 may be formed from aluminum, first electrode 24' may be formed from gold, dielectric contact layer 28' may be formed from PTFE, and second electrode 26' may be formed from the aluminum of at least a portion of second housing wall 22b, at least a portion of fourth housing wall 22d, and at least a portion of sixth housing wall 22f. However, in other triboelectric generator embodiments, other triboelectric materials may be used for the first electrode, first dielectric contact layer, and second electrode. In addition, the response or operation of the generator 20' will be described for application of a single applied force pulse. It will be understood that this response may be repeated for a cyclic force or an additional impulse force.

First electrode 24' may be electrically coupled to a load 99 (such as an LED, a battery, or other load) as shown in FIGS. 3-4D by a first conductive element 47 (such as a wire). Similarly, second electrode 26' may be electrically coupled to the load 99 by a second conductive element 49. This enables a flow of generated current between the electrodes during operation of the triboelectric cycle. Current flows from the electrodes 24' and 26' may be operated on by an associated power management circuit (not shown) prior to transmission to the load 99. During operation of the triboelectric generator 20', a cycled generation of potential difference between the first and second electrodes 24' and 26' may drive a flow of electrons through the load 99.

Operation of the triboelectric generator 20' involves movement of one or more of the first and second housing walls 22a and 22b in direction(s) toward each other as described herein, such that a separation distance between the first and second electrodes 24' and 26" decreases and so as to bring the attached second electrode 26' and the dielectric contact layer 28' into direct contact. Operation of the triboelectric generator 20' also involves subsequent movement of one or more of the first housing wall 22a and the second housing wall 22b in direction(s) away from each other, so that contact between the second electrode 26" and the dielectric contact layer 28' is broken and a separation distance between the first and second electrodes 24' and 26' increases. These movements of the first and second housing walls produces a flow of charges between the first and second electrodes 24' and 26' in the form of an alternating current as described herein.

Relative movement of the dielectric contact layer 28' and the second electrode 26' into and out of contact may occur only once (for example, in response to an impulse of shock loading on a portion of the triboelectric generator housing), or the relative movement may be cyclical, for example, in response to a repeating and/or periodic loading such as a low frequency shaking or vibration.

For purposes of illustrating operation of the triboelectric generator 20', FIG. 3 shows a schematic representation of the generator 20' in a first loaded condition and in static equilibrium. The housing 22 may be supported by a force SS1 exerted by a support surface 53 against which the housing 22 rests and (optionally) through which a change in the existing loading on the housing may be applied. Force F2 acting on second housing wall 22b may be represented, for example, as a force exerted by a mass M1 on second housing wall 22b in addition to the weight of the triboelectric generator. This loading configuration may be analogous to the situation a vehicle occupant (mass M1) seated on a seat cushion supported by a floor of a vehicle.

In the static condition shown in FIG. 3, prior to application of a vibration or another change in the loading condition of the generator 20', a separation between the dielectric contact layer 28' and the second electrode 26' is maintained due to the stiffness of the housing structure, which may deform responsive to the forces F2 exerted by the applied mass and the weight of the housing 22 and attached electrodes, and force SS1 exerted by the support surface 53. There is no charge transferred between the first and second electrodes 24' and 26', and thus no electric potential difference.

The housing 22 may be structured to deform elastically from an unloaded state, responsive to the static loading shown in FIG. 3. The generator 20' may also be structured and positioned in a usage environment so that a change in loading on the housing 22 may be applied to one or more of the first and second housing walls 22a and 22b, so as to resiliently deform the housing 22 as described herein. Any of the housing or housing network embodiments described herein may be designed and structured to resiliently deform and operate as desired under a predetermined set of static and dynamic loading conditions.

Deformation of the housing 22 from the static equilibrium condition may be responsive to an applied change in loading on the housing applied along first housing wall 22a and/or second housing wall 22b. Referring to FIG. 4A, when the existing loading is changed by application of an additional external force F1 (which may be exerted through the support surface 53), the first housing wall 22a may move in a direction R1 toward the second housing wall 22b. The additional force F1 may be an impulse load or part of a cyclic loading (for example, a low-frequency vibrational input). An external load or force such as force F1 may be defined as a load applied to a portion of the housing structure from an exterior of the structure (i.e., a load not applied by one of the walls to another wall or to a connection between walls of the housing). Forces SS1 and F2 may vary dynamically as mass M1 reacts to forces applied to first housing wall 22a and transmitted to the second housing wall 22b through elastic deformation of the third, fourth, fifth, and sixth housing walls 22c-22f and the connections between the housing walls.

Due to the inertia of the mass M1 and the resilient deformation of the housing walls 22c-22f and the connections between the walls, there may be little or no initial movement of the second housing wall 22b responsive to application of the force F1. Subsequently, first housing wall 22a continues to move toward second housing wall 22b faster than the second housing wall 22b moves away from first housing wall 22a, until the dielectric contact layer 28' makes direct contact with the second electrode 26' as shown in FIG. 4A. Contact between the dielectric contact layer 28' and the second electrode 26' results in electrons being transferred from the second electrode material (e.g., aluminum) in the positive side of the triboelectric series, to a material (e.g., PTFE) in the negative side in the series located along the first housing wall 22a. Thus, contact between second electrode 26' and the PTFE dielectric contact layer 28' (and also possible sliding contact between the second electrode 26' and the dielectric contact layer 28') will result in electrons being transferred from the aluminum second electrode 26' to the PTFE surface of dielectric contact layer 28', leaving a surplus of positive charges on the aluminum second electrode 26' and a surplus of negative charges on the PTFE side.

Referring to FIG. 4B, when the newly applied force F1 is no longer exerted on first housing wall 22a, the first housing wall 22a will stop moving in the direction R1 and will start to move in a direction R2 away from second housing wall 22b, back toward its original position. However, due to its dynamic inertia, second housing wall 22b may tend to continue move in the direction R1, causing the walls 22a and 22b to separate, leading to a separation between the dielectric contact layer 28' and the second electrode 26'.

As second housing wall 22b continues to move in direction R1, the separation between first and second housing walls 22a and 22b increases. As a result, a dipole moment is generated between the positive triboelectric charges in the aluminum second electrode 26' and the negative triboelectric charges in the PTFE dielectric contact layer 28'. Consequently, the positive charges on the aluminum second electrode 26' attract electrons from the first electrode 24' to flow through the external load 99 and balance out the electric field. This induces a net positive charge on the gold first electrode 24'. FIG. 4B shows the resulting flow of positive charge carriers through the load 99.

Referring to FIG. 4C, this flow of electrons continues until the second housing wall 22b reaches the limit of its travel in direction R1. At this point, the separation distance between the dielectric contact layer 28' and the second electrode 26' is maximized.

Referring to FIG. 4D, after the second housing wall 22b reaches a limit of motion in direction R1, the wall 22b will be pulled in direction R2 by the restoring force exerted by the elastically deformed housing walls and the weight of the load M1. This reduces the separation distance between the dielectric contact layer 28' and the second electrode 26', thereby weakening the dipole moment generated by the separated charges. In response, free electrons flow back toward the gold first electrode 24' and through the load 99 until the dielectric contact layer 28' and the second electrode 26' come back into direct contact with each other.

At the same time, if another force F1 is applied to the first housing wall 22a (for example, as part of a cyclic loading), this force may be transferred to the second housing wall 22b, forcing the second housing wall in the direction R1 and forcing the dielectric contact layer 28' and the second electrode 26' to subsequently separate as previously described. This may begin another power generation cycle. Alternatively, the applied force may be in the nature of a singular shock load, in which case the housing 22 may dampen the applied load so that no further direct contact occurs between the dielectric contact layer 28' and the second electrode 26' until a further load is applied.

Thus, in the manner described above, alternating contact between, and separation of, the dielectric contact layer 28' and the second electrode 26' produces a combination of contact electrification and electrostatic induction in the triboelectric generator. The triboelectric generator 20' thus acts as an electron pump that drives electrons back and forth between the first and second electrodes 24' and 26', producing an alternating current through the load 99.

In addition, the electrically-conductive housing 22 serves as an electrode and a contact element of the triboelectric material pair, and also functions as a spring element enabling resilient movement of the first and second housing walls so that the dielectric material layer 28' and the second electrode 26' may engage and disengage to produce electron flow.

Loading scenarios other than the one just described may be implemented, as long as these scenarios serve to operate the triboelectric generator as described to generate current flow. Also, in housing embodiments such as 20' where the first electrode 24' and dielectric contact layer 28' extend onto one or more of the third housing wall 22c and the fifth housing wall 22e, it may be seen that the extended portions of the dielectric contact layer 28' will contact associated portions of the fourth housing wall 22d and/or the sixth housing wall 22f prior to contact being made between the dielectric contact layer 28 and the second housing wall 22b. In one or more arrangements, the compressive loads acting on the first housing wall 22a and/or second housing wall 22b may be insufficient to bring the entire area of the dielectric contact layer 28' into contact with the second electrode 26'. This may be due to the relative stiffness of the housing 22 under the applied loading. This failure to establish contact between the dielectric contact layer 28' and the second electrode 26' over the entire available contact area of the dielectric contact layer 28' may result in a relatively smaller generation of current by the triboelectric generator.

If a loading is too small relative to a stiffness of a given housing, the dielectric contact layer 28' and the second electrode 26' may not come into contact (or the contact made may be insufficient to meet desired power generation requirements). Increasing the loading may increase the contact area, thereby increasing power generation. However, if a loading is too large relative to a stiffness of a given housing, it may be difficult to reliably achieve the separation between the dielectric contact layer 28' and the second electrode 26' needed for proper functioning of the triboelectric generator.

It has been found that adjusting the parameters affecting the stiffness and dynamic response of the hexagonal housing structure (or the associated parameters of a network of housing structures, as described below) with respect to an expected range and type of loadings may enable the generated current and voltage to be maximized or optimized for the given range of estimated loadings. Given the requirements of a particular application and information regarding the factors affecting the stiffness of the hexagonal housing, the details of a housing structure which may provide a desired or acceptable degree of contact between the dielectric contact layer 28' and the second electrode 26' for a given range and type of applied loads may be determined analytically and/or experimentally.

Figure 5:
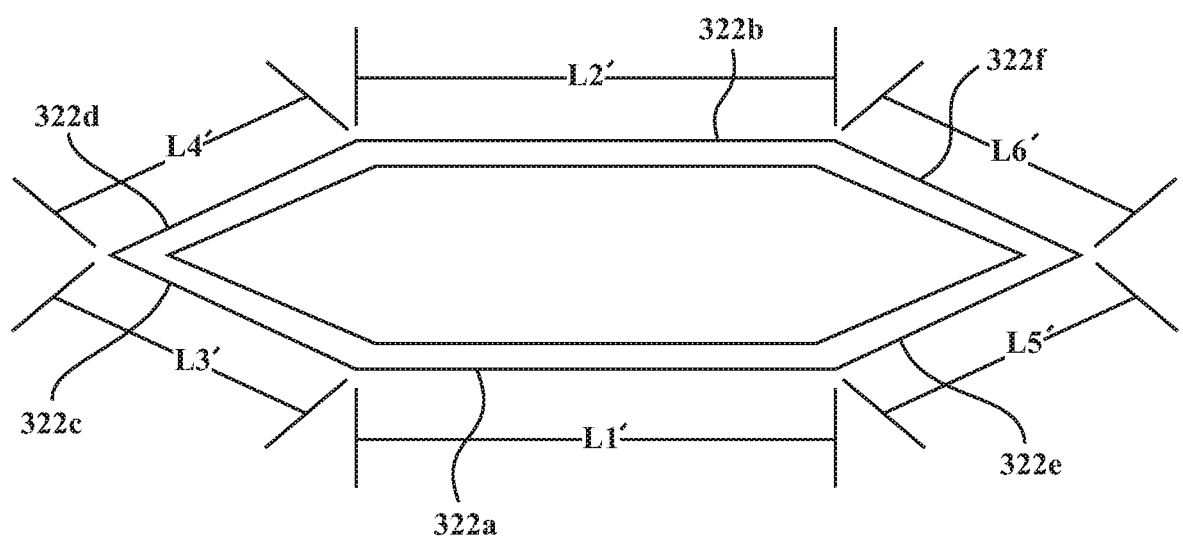
FIG. 5 is a schematic end view of a hexagonal triboelectric generator housing in accordance with an embodiment described herein.

Factors affecting housing stiffness may include housing material properties, housing wall thicknesses, the lengths of the third, fourth, fifth, and sixth housing walls, the depths of the walls, the angles formed between the first and second housing walls and walls connected directly to them when the housing is in an unloaded condition, the number of contiguous housings incorporated into the structure along the axis of loading (for structures incorporating multiple housings as described herein), and other factors. For example, making the third, fourth, fifth, and sixth housing walls 22c-22f relatively shorter may increase the housing stiffness. For example, FIG. 5 shows a housing structure 322 in accordance with another embodiment, similar in structure to housing 22 previously described. Hexagonal housing 322 may have a first side or housing wall 322a, a second side or housing wall 322b, a third side or housing wall 322c, a fourth side or housing wall 322d, a fifth side or housing wall 322e, and a sixth side or housing wall 322f. The first housing wall 322a may have a first length L1', and the second housing wall 322b may have a second length L2'. The third housing wall 322c may have a third length L3', and the fourth housing wall 322d may have a fourth length L4'. The fifth housing wall 322e may have a fifth length L5', and the sixth housing wall 322f may have a sixth length L6'. Referring to FIG. 5, in one or more arrangements, each of the third, fourth, fifth, and sixth lengths L3'-L6' may be different from either of the first length L1' and the second length L2'. Also, in the particular embodiment shown in FIG. 5, the first length L1' and the second length L2' are equal, the third, fourth, fifth, and sixth lengths L3'-L6' are equal, and the first and second lengths L1' and L2' are greater than any of the third, fourth, fifth, and sixth lengths L3'-L6'. Because the lengths L3'-L6' of walls 322c-322f are shorter than the lengths of walls 322a and 322b, the housing structure shown in FIG. 5 may be relatively stiffer than a structure where all the walls are of equal length.

In another example, decreasing the angle formed between the first housing wall 22a and the third housing wall 22c may increase the stiffness of the housing, by increasing the amount by which the third housing wall 22c must deflect relative to the first housing wall 22a in order to establish contact between the dielectric contact layer 28' and the second electrode 26'.

Referring to FIGS. 6A-6D, 7 and 8, in one or more arrangements, to increase power generation, multiple hexagonal housings in accordance with embodiments described herein may be incorporated into (and formed as) a three-dimensional array or contiguous arrangement of connected, identical or substantially identical housings. Each housing of the network may have the same design specifications, and the housings may be fabricated so as to be as identical to each other as possible, within the limits of manufacturing tolerances, material properties, etc. This contiguous arrangement of triboelectric generator housings may be used to form a network of electrically-connected triboelectric generators. This network may function as (or be a component of) a power generating system including a plurality of contiguous hexagonal triboelectric generators.

It has been found that a ratio of generated power of a triboelectric generator network to the total volume occupied by the triboelastic generators in the network may be maximized or at least increased over that provided by a conventional in-line stacking arrangement, by providing a network of contiguous, hexagonal triboelastic generators as described herein. It is believed that this volume efficiency arises, at least in part, from the sharing between adjacent housings of side walls extending between the end walls containing the contacting electrode and dielectric contact layer, the interleaved arrangement of the sidewalls of adjacent housings as shown in FIGS. 6A-6D, and the uniform wall thicknesses of the side walls. As used herein, "contiguous" means "sharing a common border" or "touching". It may be seen from the drawings that the hexagonal triboelectric generator housings of the networks described herein touch each other, and that each housing in a network shares at least one wall with another, adjacent housing. In addition, it may be seen that application of external forces to a triboelectric generator network structured as shown in FIGS. 6A and 6b will act to resiliently deform not only the housings in the central portion of the network, but also the groups of housings along either side of the central group of housings.

Referring to FIGS. 6A-6D, 7 and 8, various embodiments of a triboelectric generator network may be provided. Each embodiment may include a plurality of contiguous, resiliently-deformable hexagonal housings as previously described, and each housing may be used to fabricate an associated triboelectric generator as previously described. Also, each triboelectric generator may have a hexagonal housing including a first housing wall and a second housing wall positioned opposite the first housing wall. In addition, at least one first housing wall and at least one second housing wall of the plurality of contiguous hexagonal triboelectric generators may be structured and positioned to function as load application walls through which loading may be applied to the plurality of triboelectric generators to operate at least a portion of the triboelectric generators.

In one or more arrangements, a triboelectric generator housing (including its constituent walls) may be formed as a continuous, single piece, for example, using an extrusion technique. This may form a hexagonal tube defining a cavity in which the electrodes and dielectric contact layer may be positioned.

Figure 7:
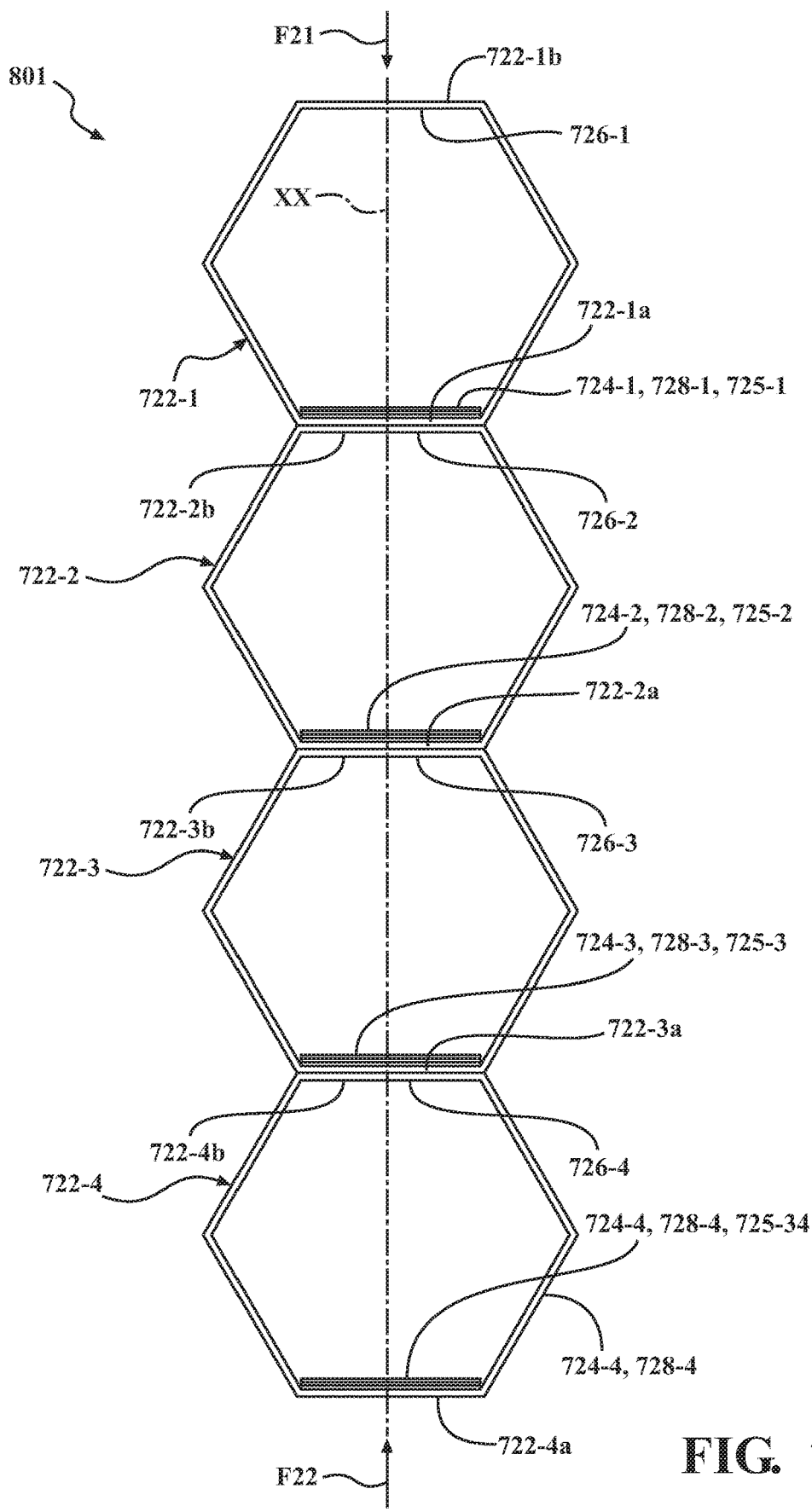
FIG. 7 is a schematic end view of a hexagonal triboelectric generator network in accordance with another embodiment described herein.

Referring to FIG. 7, in one embodiment 101 of a triboelectric generator network, a plurality of individually-formed hexagonal housings 722-1, 722-2, 722-3, and 722-4 may be stacked along a common axis XX so as form a column positioning second housing walls 722-2b through 722-4b of the housings in contact with associated ones of first housing walls 722-1a through 722-3a of adjacent housings, as shown. The housings 722-1, 722-2, 722-3, and 722-4 may be secured to each other in this arrangement using any suitable method, for example, by adhesive application. The network 101 may be incorporated into another device or structure so that external deformation forces or loads F21 and F22 applied to operate the triboelectric generator network 101 may be applied to first housing wall 722-4a and to second housing wall 722-1b.

An external load or force applied to a network of hexagonal triboelectric generators may be defined as a load applied to at least a portion of the triboelectric generator network from an exterior of the structure (i.e., a load not applied by one of the walls to another wall of the network, or to a connection between walls of the network). The external load may be applied to a lower portion of the network as shown in FIG. 7, or the load may be applied to a second housing wall at a top portion of the network (such as wall 722-1b).

Due to the interconnected nature of the conductive hexagonal housings in the contiguous networks described herein, each second electrode of the network (formed by the electrically interconnected second housing walls) may be electrically connected with other second electrodes in parallel without external wiring. In addition, although the structure and operation of the networks and their constituent housings have been described in terms of a single housing of the network for clarity, it may be seen from the various network embodiments shown in the drawings that, since the housing walls may be shared between adjacent housings, the same wall may have different positions in different housings of the network. For example, the housing wall 22-1c in housing 22-1 of FIGS. 6A-6D may also be housing wall 22-2f in the housing 22-2 shown in FIGS. 6A-6D.

FIG. 6A shows an additional embodiment of a network with multiple contiguous and interconnected hexagonal triboelectric generators. Each triboelectric generator may share at least one sidewall with an adjacent generator.

In an embodiment of a triboelectric generator network, the various walls of the housings of the generators forming the network may be formed from separate pieces of material which are shaped and secured together to provide the structures described herein. Thus, a hexagonal housing as described herein is understood to be defined by the walls defining a hexagonal cavity and including two opposed parallel walls, with an additional four walls extending between the first and second housing walls as described herein. The walls forming a given hexagonal shape may be formed from a single piece of material, or the walls may be formed from more than one piece of material. The hexagonal triboelectric generator includes a hexagonal housing structure with the first electrode and dielectric contact layer positioned along a first housing wall, and a second electrode along the second housing wall opposite the first housing wall.

Figure 8:
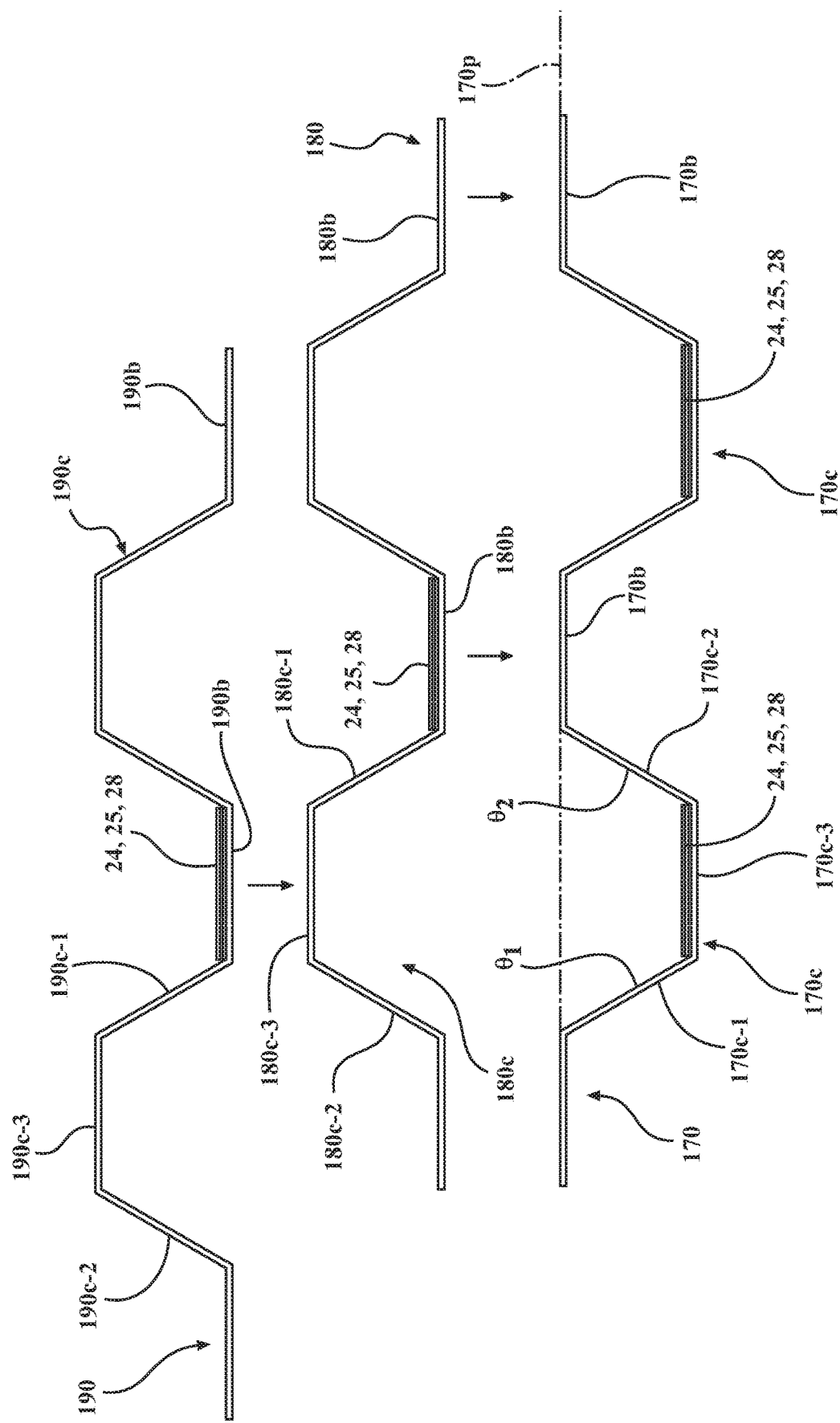
FIG. 8 is a schematic view illustrating an embodiment of a method of fabricating a hexagonal triboelectric generator network.

Referring to FIG. 8, in one or more arrangements, a network of hexagonal triboelectric generators having the configuration shown in FIGS. 6A-6D may be produced using multiple corrugated metallic sheets, starting with sheets 170 and 180. The sheets may be formed, for example, from aluminum. Each of the sheets 170, 180, and 190 described below may have the same shapes and dimensions and may be formed in the same manner, for example, using the same tool.

Referring to sheet 170 as a representative example, each sheet may have a base portion 170b defined by a flat or unformed sheet into which corrugations 170c may be formed (by stamping, for example). A plurality of spaced-apart corrugations 170c may be formed into the base portion 170b so as to extend from a plane 170p defined by the unformed sheet 170. Each corrugation 170c may have an opposed pair of sidewalls 170c-1 and 170c-2 forming oppositely-facing acute angles $\Theta_1$ and $\Theta_2$ with respect to the plane 170p of the base portion 170b. The sidewalls 170c-1 and 170c-2 may be connected by an end wall 170c-3 spaced apart from the plane 170p of the base portion 170b and extending parallel to the base portion. In combination, the sidewalls 170c-1 and 170c-2 and the endwall 170c-3 define a cavity therebetween.

A first electrode 24 and a dielectric contact layer 28 may be applied to each of the end walls 170c-3 inside the cavities. The first electrodes 24 may be secured to the end walls using an insulative double-sided tape (not shown) or any other suitable means, as previously described. On sheet 180, a first electrode 24 and a dielectric contact layer 28 may be applied to the base portion 180b between adjacent corrugations 180c as shown. The sheets 170 and 180 may then be positioned in "mirror image" fashion with respect to each other as shown in FIG. 8, so that the base portions 170b of sheet 170 and 180b of sheet 180 reside directly opposite each other and the end walls 170c-3 of sheet 170 and 180c-3 of sheet 180 reside directly opposite each other. The base portions 170b and 180b of the sheets 170 and 180 may then be secured to each other (using an adhesive or other means) so that the end walls 170c-3 and 180c-3 of the sheets face opposite each other through the cavities formed in the sheets. When the sheets 170 and 180 are joined together as described herein, the sidewalls 170c-1 and 170c-2 of sheet 170 and 180c-1 and 180c-2 of sheet 180 may form sidewalls of an associated hexagonal housing, and each associated one of endwalls 170c-3 and 180c-3 endwall residing between any two sidewalls may form one of the first and second sides of the housing along which the electrodes reside. Another corrugated sheet 190 may be prepared in a manner similar to sheet 180, and the end walls 190c-3 of the sheet 190 may be aligned with and attached to the end walls 180c-3 of sheet 180 as shown FIG. 8 and as previously described. In this manner, a network of hexagonal triboelectric generators may be produced. The finished network may have the configuration shown in FIGS. 6A-6D. The resulting contiguous network of hexagonal housings may be made into any associated number and arrangement of hexagonal triboelectric generators. The housing walls may be made to any desired lengths.

It may be seen in the embodiment just described that the portions of each housing defining the first and second housing walls containing or forming the generator electrodes and dielectric contact layer, will have thicknesses of twice the sheet thickness, while the sidewalls of the housings will each have a thickness of one material thickness.

In an alternative method, a commercially-available aluminum honeycomb structure may be used to provide the hexagonal housing network structure shown in FIGS. 6A-6D. The electrodes and dielectric layers may then be attached to suitable surfaces of the honeycomb structure as described herein. Such a honeycomb structure is commercially available from any of a variety of sources, for example, HoneyCommCore, LLC, of Jupiter, Fla.

In effect, the conductive housing network in the embodiments described above functions as a single second electrode, without the need for additional interconnections between the second electrodes of the individual housings.

In addition, it has been found that the total volume occupied by a network of contiguous hexagonal housings or generators may be controlled by pre-compressing the network structure prior to actual use, to achieve a minimum separation between the dielectric contact layer and the second electrode needed for the desired functioning of the generators. This maintains the geometric efficiency of the contiguous hexagonal arrangement, while minimizing the total volume occupied by the network. This also aids in maximizing the power density of the generator network. A single housing or triboelectric generator may be pre-compressed as described herein, or a group or network of housings or generators may be pre-compressed.

The process of pre-compression as described herein involves compressing a previously formed housing or generator (or contiguous network of housings or generators) using loads applied at locations where end-use loads will be applied to the housing or network, and prior to end-use operation of the housings/generators to produce electricity. The housings or generators are compressed so as to plastically deform the housings or generators with a view to reducing and controlling a spacing between the first and second electrode-bearing walls of the housing(s), and adjusting the stiffness or force-deflection responses that the resulting housings will having during end-use or operational loading.

Figure 6D:
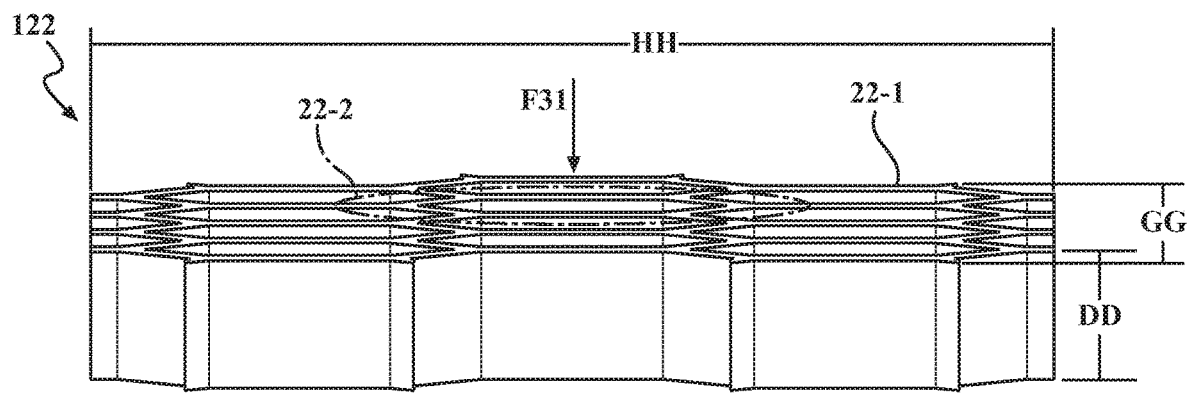
FIG. 6D is a schematic perspective view of the network shown in FIG. 6C, after pre-compression.

A network of contiguous hexagonal housings or triboelectric generators may be pre-compressed by application of an external pre-compression force F31 to an exterior of the network, as shown in FIGS. 6A-6D. FIG. 6A is a schematic end view of a network 122 of generators structured as shown in FIG. 2 prior to pre-compression. FIG. 6A shows exemplary housings 22-1 and 22-2 of the network structured as shown in FIG. 2. FIG. 6B is the end view of the network shown in FIG. 6A after pre-compression. FIG. 6C is a perspective view of the pre-compressed network shown in FIG. 6A, showing the depth dimension DD. FIG. 6D is a perspective view of the compressed network shown in FIG. 6B. In the pre-compressed network, the separation distance between the first housing wall and the second housing wall of each housing in the network may have a value of D1 (plus or minus a certain tolerance). For example, a pre-compression force F31 may be applied to a plate or other element P3 spanning multiple second housing walls 22b of multiple contiguous housings 22. This load F31 may then be transferred to (and distributed among) the triboelectric generators positioned between the load application surface P3 and support surface S3 located along the network exterior, as described herein. In the final pre-compressed network having the configuration shown in FIG. 6B, the separation distance between the first housing wall and the second housing wall of each housing in the network may have a value of D2 (plus or minus a certain tolerance, and after removal of the load and springback of the material), with D2<<D1. Thus, a substantial reduction in the volume occupied by the network may be achieved.

It will be understood that a network of hexagonal housings structured as shown in FIG. 2 rather than generators may be incorporated into a network as shown in pre-compressed as described herein. In this case, the electrodes and dielectric contact layers may be added to the housings after pre-compression.

In order to help ensure and retain resilient deformation of the network housings so that the first and second housing walls will separate to the desired spacing after contact between the dielectric contact layer and the second electrodes in each housing, it is desirable to ensure that the range and type of anticipated operational loadings will provide the desired contact without equaling or exceeding the applied pre-compression force. Stated another way, it is desirable that the operational force required to provide contact between the dielectric contact layer and the second electrode will always be less than the force applied to pre-compress the network prior to use. Thus, the applied pre-compression force may be selected with respect to the expected range of operational loadings on the network so that the expected operational loading is always less than the pre-compression force.

The magnitude of the pre-compression force F31 to be applied to pre-compress the housing or network may be determined in relation to the estimated range and type of operational forces to be applied to the housing or network (i.e., the range and type of forces expected to be applied to the housing or network in the actual electricity-generating application or end-use environment), such that the pre-compression force will be greater than any of the operational forces in the estimated range of operational forces. A relatively larger applied pre-compression force may result in relatively smaller spacings D2 between the first and second housing walls (or between the dielectric contact layers and associated second electrodes residing along the second housing walls). Providing relatively smaller spacings between the first and second housing walls may also provide a network which occupies a correspondingly smaller volume of space, thereby increasing the power density of the network. In addition, a relatively larger applied pre-compression force may also result in a relatively stiffer overall structure. In a relatively stiffer overall structure, a relatively greater applied load may be required to achieve contact between the dielectric contact layer and the second electrode during operation of the generator. Similarly, a relatively smaller applied pre-compression force may result in relatively larger end spacings between the first and second housing walls, and may also result in a relatively "softer" overall structure. In a structure which is not as stiff, a relatively smaller applied load may be required to achieve contact between the dielectric contact layer and the second electrode during operation of the generator. Thus, there may be some trade-off between the increased power density achievable by applying a relatively larger pre-compression force, and the operational force required to achieve dielectric contact layer-electrode contact in the stiffer structure produced by application of a relatively larger pre-compression force. It may be desirable to pre-compress the housing so as to achieve the smallest dielectric contact layer-electrode spacing that enables the desired contact responsive to applied forces less than the pre-compression force. Given the estimated range of operational forces to be applied to the housing or network and the structural parameters (material properties, housing wall thicknesses, etc.) of the housing or network, a pre-compression force may be determined (analytically and/or experimentally) which provides a housing or network suitable for a particular end-use application. A housing or network as described herein may also be designed and fabricated so that the housing or network resiliently deforms responsive to a range and type of anticipated operational loadings without pre-compression prior to use.

Each of the generators incorporated into the network 122 of contiguous housings shown in FIGS. 6A-6D may operate in the same manner as the triboelectric generator embodiment 20' previously described. That is, external loads applied to the load application surfaces of the network 122 may be distributed among the housing structures of the network so as to resiliently deform each of the housings as previously described, and to operate the triboelectric generators of the network to generate power in same manner as cycle previously described with regard to housing 22. Also, in a housing or network that has been pre-compressed as described above, no operational loading should equal or exceed the applied pre-compression force.

In cases where a low-frequency cyclic loading of the structure is anticipated, the physical characteristics of the structure (such as wall thicknesses, spacing between dielectric contact layer and second electrode, and other parameters) may be determined analytically and/or by experimentation with respect to the anticipated loading so as to synchronize or provide resonance between the dynamic response of the structure and the applied loading. Thus, the structure may be fabricated so that triboelectric contact may occur in response to each cycle of input loading.

Example

Referring to FIGS. 2, 4A-4D, 6A-6B, and 9-11B, in one example of implementation of an embodiment of triboelectric generator housing network described herein, a section of commercially-available honeycomb structure formed from aluminum 3003 was processed to form a network of multiple hexagonal triboelectric generators similar to network structure 122 of FIG. 6A for test purposes. The honeycomb structure had the configuration of structure shown in FIG. 6A prior to pre-compression, and the configuration shown in FIG. 6B after pre-compression.

Dielectric pieces and first electrodes were attached to each constituent hexagonal housing of the test structure in an arrangement similar to that shown in FIG. 2, with each first electrode and dielectric contact layer extending from the first housing wall onto at least a portion of an associated third housing wall and onto at least a portion of an associated fifth housing wall. The section of honeycomb structure used had a depth dimension DD of 38 millimeters. Prior to attachment of the dielectric pieces and first electrodes to the hexagonal housings and pre-compression, each hexagonal triboelectric generator housing structure defined by the honeycomb structure had a spacing of 24 millimeters between the opposed first and second housing walls as described herein. The material thickness of the third, fourth, fifth, and sixth housing walls of each housing was 0.06 mm.

Pieces of PTFE thin film were used as dielectric materials. The PTFE thin film used had a thickness of 50 μm and an aluminum coating having a thickness of less than 100 nanometers on one side. The aluminum coating served as the first electrode in the hexagonal housings forming the honeycomb structure used for testing.

The film used was purchased from Multek Inc. The film was cut into squares of 38 millimeters by 38 millimeters. The dielectric layers, associated first electrodes, and pieces of double-sided tape were sized to extend to the third and fifth housing walls of each housing, as previously described. A 38 mm×38 mm dielectric film square was adhered to the first, third, and fifth housing walls of each hexagonal housing of the honeycomb test structure, using a 38 mm×38 mm piece of double-sided tape. The PTFE side of each film piece was positioned facing the housing second wall of the housing in which the film piece was secured. Thus, in each housing, the contact area between the PTFE dielectric contact layer and the second electrode formed by the housing second wall was 38 mm×38 mm.

The aluminum first electrodes on the PTFE films pieces in different hexagonal housings cells were connected by external wiring, while the second electrodes incorporated into the aluminum honeycomb structure were already electrically connected as described herein.

After attachment of the first electrodes and dielectric pieces, the hexagonal triboelectric generator network test structure has the configuration shown in FIG. 6A prior to pre-compression, with aluminum first electrodes in the test structure substituted for the gold first electrodes in the network structure 122 shown in FIGS. 6A and 6B.

Optionally, if desired, the PTFE film surface may be modified using a known inductively coupled plasma reactive ion etching process to obtain a nanorod surface. In one example of surface modification, a 50 μm-thick aluminum coated PTFE thin film as described above was cleaned, in sequence, with isopropyl alcohol and de-ionized water, and then blown dry with argon gas. A thin aluminum film (approximately 10 nm thick) was then deposited on the surface of the PTFE film by sputtering to serve as a mask for a subsequent reactive ion etching process which was used to create the nanorod structure. The aluminum film was deposited using a Plasma-Therm model 790 chemical vapor deposition system. However, other suitable devices may be used. Argon, $O_2$, and CF4 gases were introduced into the system deposition chamber with flow rates of 15.0, 10.0, and 30.0 standard cubic centimeters per minute (sccm), respectively. A power source of 400 W was used to generate the plasma ions. The etching time was about 10 minutes, and the diameter of the as-fabricated nanorods on the PTFE film surface ranged from about 0.5 μm to about 1 μm.

To increase the generated power density while providing the structural resilience needed to ensure that the first and second housing walls move away from each other when forces applied to the first and second housing walls are removed or reduced, the network test structure was sandwiched between two parallel plate structures P3 and S3 in a manner similar to that shown in FIGS. 6A and 6B, and pre-compressed by applying a 700 N force using a hand press unit on the upper plate. A pre-compressing force (such as force F31 shown in FIG. 6B) was applied to the upper plate at a loading rate of 0.5 meter/second. The network test structure was pre-compressed to a configuration similar to that shown in FIG. 6B. Thus, the final pre-compressed structure in FIG. 6B had a volume equal to approximately 2.7% of the volume of the original structure shown in FIG. 6A. A height of the network structure 122 may be denoted by GG, and a width of the network structure 122 may be denoted by HH. After pre-compression, the network test structure had a depth dimension DD of 38 centimeters, a compressed height dimension GG (i.e., a height dimension of the structure with no separation between dielectric contact layers and associated second electrodes) of 1.2 millimeters, and a width dimension HH of 82 centimeters.

The pre-compression process may be used to adjust the spacings between the dielectrics in the individual housings and associated second electrodes formed by the second housing walls, and to adjust the stiffness and dynamic response of the hexagonal triboelectric generator network to applied loads, according to the requirements of a particular application. As previously explained, a relatively larger pre-compression force applied to the hexagonal triboelectric generator network may provide a relatively smaller spacing between the dielectrics and the second electrodes, and a relatively stiffer overall structure, while a relatively smaller pre-compression force applied to the structure to pre-compress the structure may provide a relatively larger spacing between the dielectrics and the second electrodes, and a relatively more pliable overall structure. Also as previously explained, due to the electrical conductivity between the contiguous hexagonal housings of the structure, the second electrodes of the structure are connected without the need for external wiring.

Application of a pre-compression force above a certain structure-dependent maximum may plastically deform the structure to the extent that it will not resiliently deform as desired for the given application. The maximum pre-compression force that me be applied to a given hexagonal triboelectric generator network structure without impairing the intended functioning of the structure may be determined analytically and/or experimentally, using known methods.

To evaluate the dynamic response and voltage and current generating capacity of the triboelectric generating network test structure responsive to a low-frequency vibrational input, the lower plate structure S3 to which the test structure was mounted was secured to an electrodynamic shaker. For purposes described herein, the range of frequencies falling within the category of "low frequency" may include frequencies from 0 to 15 Hz. The shaker may have a tunable frequency and amplitude and may be configured to apply a low frequency sinusoidal input to the triboelectric generating network test structure, to simulate low-frequency vibration in an end-use environment, such as vehicle cabin floor vibration. The shaker used was a Labworks ET-126 Electrodynamic Transducer.

Figures 9, 10:
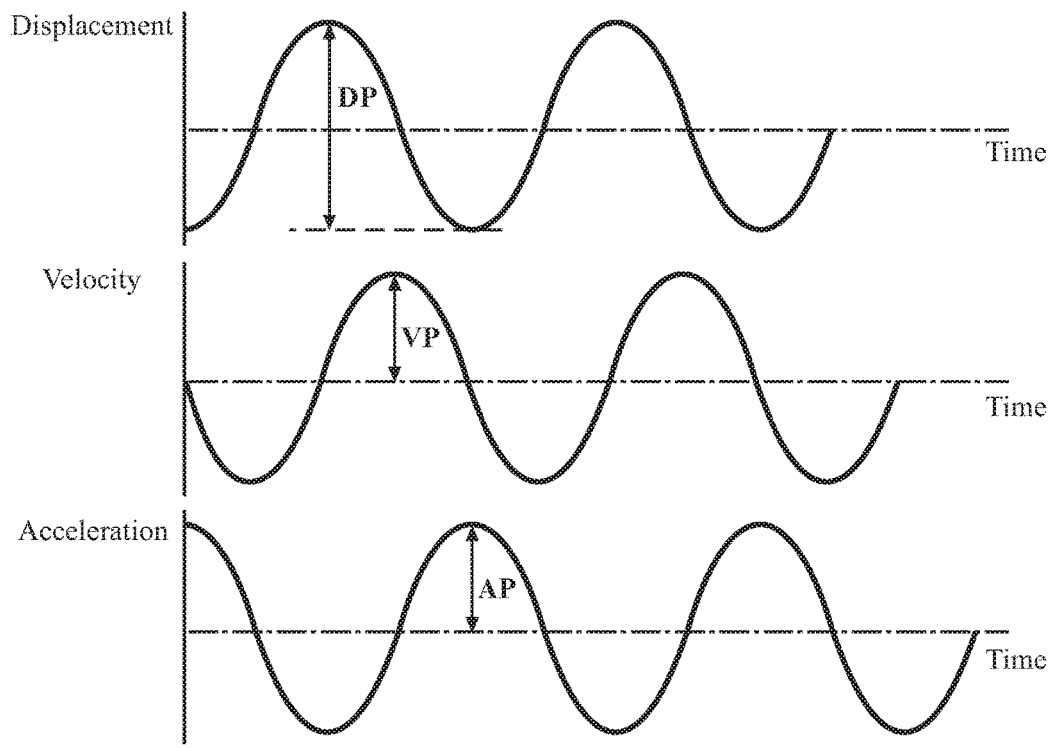
FIGS. 9 and 10 are schematic views illustrating characteristics of a low-frequency external force applied to a triboelectric generator test network, for testing purposes.

The open-circuit output voltage was measured by a Wave-Jet Touch 334 Oscilloscope (available from Teledyne LeCroy), and the short-circuit output current was measured by an SR570 low-noise current preamplifier Low Noise Current Amplifier (available from Stanford Research Systems). A sinusoidal input was applied to the test structure to resiliently and cyclically deform the structure as described with respect to FIGS. 4A-4D. The amplitude of the force applied by the shaker was set to 0.0025 m, and the frequency was set to 10 Hz. The resulting acceleration and velocity of the lower plate connected to the triboelectric generating network was calculated and is shown in FIG. 10. The external loads were applied by the shaker in a manner designed to produce repeated cycles of power generation as previously described with respect to the power generation cycle shown in FIGS. 4A-4D.

The sinusoidal input generated by the shaker was adjusted so that the applied external force for operating the triboelectric generators and resulting reaction forces will be always less than the force used to pre-compress the triboelectric generator network structure, so that the spacings between the dielectrics and the second electrodes in the housings will spring back to their desired values after removal of the applied external forces, as previously described. The applied external forces may be less than the pre-compression force, but large enough to provide contact between the dielectrics and the second electrodes during application of the external forces.

On the upper plate in contact with the triboelectric generator network, a mass (such as mass M1 of FIGS. 6A and 6B) was applied to simulate a weight of a driver on a seat cushion. The applied input frequency, calculated peak-to-peak displacement DP of the lower plate S3, peak velocity VP of the lower plate S3, and the peak acceleration AP of the lower plate S3 are shown in FIGS. 9 and 10. Typical output waveforms for open circuit voltage $V_{OC}$ and short circuit current $I_{SC}$ corresponding to various masses M1 applied to the upper plate P3 in contact with the triboelectric generator network are shown in FIGS. 11A-11B.

The graphs in FIGS. 11A-11B show representative portions of each output waveform generated using an associated mass. For example, a zone 1102 of the graph shown in FIG. 11A shows a portion of an output waveform for the short-circuit current $I_{SC}$ produced when a mass M1 of 16 grams was applied to the triboelectric generator network along an upper surface of the network. Similarly, a zone 1106 shows a representative portion of an output waveform for the short-circuit current $I_{SC}$ produced when a mass M1 of 80 grams was applied to an upper surface of the triboelectric generator network.

Likewise, in FIG. 11B, a zone 1203 shows a representative portion of an output waveform for the open circuit voltage $V_{OC}$ produced when a mass M1 of 32 grams was applied to an upper surface of the triboelectric generator network. Similarly, a zone 1207 shows a representative portion of an output waveform for the open circuit voltage $V_{OC}$ produced when a mass M1 of 130 grams was applied to an upper surface of the triboelectric generator network.

FIGS. 11A and 11B show only representative portions of the output waveforms corresponding to each value of applied mass M1, so that the effect of the applied mass M1 on the magnitudes of the waveform values may be readily seen and conveniently compared. It will be understood that the portion of each output waveform shown is representative of the overall shape and period of the remainder of the output waveform for the associated value of applied mass. The portion of each waveform selected for display in FIGS. 11A and 11B also includes the maximum generated magnitude of the output parameter for an associated applied mass, so that an evaluation of the quasi-sinusoidal properties of the waveform may be undertaken, as described herein.

As shown in FIGS. 11A-11B, the applied mass M1 is an important factor affecting the magnitudes of the short circuit current $I_{SC}$ and the open circuit voltage $V_{OC}$. For example, under a mass of 16 grams and an applied shaker frequency of 10 Hz, the maximum $I_{SC}$ and $V_{OC}$ generated by the generator network were 0.7 µA (zone 1102) and 4.1 V (zone 1202), respectively. When the mass increased to 80 g, a maximum $I_{SC}$ of 3.6 µA (zone 1106) and a maximum $V_{OC}$ of 16.8 V (zone 1206) were achieved. Such an increase in $I_{SC}$ and $V_{OC}$ with mass (up to a certain value of mass M1) may be attributable to increases dielectric-second electrode contact area (and a resulting larger amount of triboelectric charges) provided by the increased mass.

In addition, it has been found that a triboelectric generator network formed from a network of contiguous hexagonal triboelectric generator housings and structured as shown in FIGS. 6A and 6B may produce quasi-sinusoidal signal waveforms of open-circuit voltage and short-circuit current, responsive to application of a low frequency vibration input as described above. For purposes described herein, a quasi-sinusoidal output waveform or response to an input may be defined as a waveform having certain characteristics similar to a conventional sinusoidal waveform. The quasi-sinusoidal output waveforms described herein may have frequencies which are the same as a sinusoidal or cyclic external force applied to a network of contiguous hexagonal triboelectric generators as described herein, and which cause the network of generators to operate as previously described to generate power. In addition, the quasi-sinusoidal output waveforms described herein may also have alternating positive and negative peaks (relative to a zero reference value) with amplitudes having equal absolute values, within a predetermined tolerance range. That is, all of the amplitudes of the positive peaks may have the same absolute values within the specified tolerance zone, and all of the amplitudes of the negative peaks may have absolute values that are the same as the absolute values of the positive peaks, within the specified tolerance zone.

In one or more arrangements, the tolerance zone for the waveform positive and negative peaks may be defined by a range of values between the absolute value of the largest amplitude of the positive and negative peaks, and a value up to a certain predetermined percentage below the absolute value of the largest amplitude. Examples of such quasi-sinusoidal output waveforms for open circuit voltage $V_{OC}$ and short circuit current $I_{SC}$ are shown in FIGS. 11A and 11B. For example, in the open circuit voltage output waveform segment 901 produced by applying a simulated low-frequency vibrational input to the triboelectric generator test sample shown in FIG. 6B, the absolute value of the largest amplitude of all of the positive peaks 901a-901e and the negative peaks may be 16.8 volts. If the tolerance zone is 10% of the absolute value of the maximum, then the tolerance zone would be 1.68 V, Thus, for the output waveform to be quasi-sinusoidal according to the criteria set forth herein, all of the absolute values of the amplitudes of the positive and negative peaks of the waveform would have values within a lower limit of 16.8 V-1.68 V=15.12 V, and an upper limit of 16.8 V. Tolerance zones for the quasi-sinusoidal output waveforms described herein may be in the range of 20% of the absolute value of the maximum amplitude of the corresponding waveform.

In addition, the waveforms shown in FIGS. 11A and 11B have periods of 0.1 second, corresponding to the applied frequency of 10 Hz. The quasi-sinusoidal output waveforms produced by operation of a triboelectric generator network configured as described herein may provide important advantages with regard to impedance matching and output power management.

Thus, embodiments described herein may provide a power generating system including a plurality of hexagonal triboelectric generators. The plurality of hexagonal triboelectric generators may be formed from an associated network of contiguous hexagonal triboelectric generator housings. Each housing of the network may be structured to be resiliently deformable responsive to an external force applied to the network so as to enable relative movement of a dielectric and an electrode positioned in the housing in directions toward and away from each other, and so as to enable contact between the dielectric and the electrode positioned in the housing. Also, the plurality of hexagonal triboelectric generators may generate a quasi-sinusoidal output responsive to a low frequency sinusoidal external force applied to the generator network.

In another aspect, it may be seen that the specification describes embodiments of a triboelectric generator including an electrically-conductive hexagonal housing having a first housing wall and a second housing wall positioned opposite the first housing wall. The second housing wall may form an electrode of the triboelectric generator. Another electrode may be positioned along the first housing wall. A dielectric contact layer may be positioned in intimate contact with the other electrode along the first housing wall, and between the other electrode and the second housing wall. The dielectric contact layer may be spaced apart from the second electrode. The hexagonal housing may be structured to be resiliently-deformable responsive to relative movement between the first housing wall and the second housing wall, so as to enable contact between the dielectric contact layer and the second housing wall for operation of the triboelectric generator.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the embodiments described herein.

What is claimed is:

1. A triboelectric generator comprising:
   a resiliently-deformable hexagonal housing including a first housing wall and a second housing wall positioned opposite the first housing wall;
   a first electrode residing along the first housing wall;
   a second electrode residing along the second housing wall; and
   a dielectric contact layer positioned in intimate contact with the first electrode and between the first electrode and the second electrode, the dielectric contact layer being spaced apart from the second housing wall,
   wherein the first housing wall is coupled to the second housing wall such that at least one of the first housing wall and the second housing wall is resiliently movable toward the other one of the first housing wall and the second housing wall so as to enable contact between the dielectric contact layer and the second electrode during operation of the triboelectric generator.

2. The triboelectric generator of claim 1 further comprising:
   a third housing wall coupled to the first housing wall so as to enable resilient angular rotation of the third housing wall with respect to the first housing wall; and
   a fourth housing wall coupled to the second housing wall so as to enable resilient angular rotation of the fourth housing wall with respect to the second housing wall,
   the third housing wall being structured and secured with respect to the fourth housing wall such that movement of the first housing wall in a direction toward of the second housing wall causes the third housing wall to resiliently rotate with respect to the fourth housing wall in a direction toward the fourth housing wall, and such that movement of the second housing wall in a direction toward the first housing wall causes the fourth housing wall to resiliently rotate with respect to the third housing wall in a direction toward the third housing wall.

3. The triboelectric generator of claim 2 further comprising:
   a fifth housing wall coupled to the first housing wall so as to enable resilient angular rotation of the fifth housing wall with respect to the first housing wall; and
   a sixth housing wall coupled to the second housing wall so as to enable resilient angular rotation of the sixth housing wall with respect to the second housing wall,
   the fifth housing wall being structured and secured with respect to the sixth housing wall such that movement of the first housing wall in a direction toward of the second housing wall causes the fifth housing wall to resiliently rotate with respect to the sixth housing wall in a direction toward the sixth housing wall, and such that movement of the second housing wall in a direction toward the first housing wall causes the sixth housing wall to resiliently rotate with respect to the fifth housing wall in a direction toward the fifth housing wall.

4. The triboelectric generator of claim 3 wherein the second electrode is formed by the second housing wall, wherein the first electrode and the dielectric contact layer extend along a portion of at least one of the third housing wall and the fifth housing wall such that the dielectric contact layer is positioned to contact an associated portion of at least one of the fourth housing wall and the sixth housing wall during operation of the triboelectric generator, and wherein a portion of the second electrode is formed by the associated portion of at least one of the fourth housing wall and the sixth housing wall.

5. The triboelectric generator of claim 4 wherein the third, fourth, fifth, and sixth housing walls have equal wall thicknesses.

6. The triboelectric generator of claim 3 wherein all of the first, second, third, fourth, fifth, and sixth housing walls have equal lengths.

7. The triboelectric generator of claim 3 wherein the first housing wall has a first length, the second housing wall has a second length, the third housing wall has a third length, the fourth housing wall has a fourth length, the fifth housing wall has a fifth length, the sixth housing wall has a sixth length, and each of the third, fourth, fifth, and sixth lengths is different from either of the first length and the second length.

8. The triboelectric generator of claim 7 wherein the first length and the second length are equal, the third, fourth, fifth, and sixth lengths are equal, and the first length and the second length are greater than any of the third, fourth, fifth, and sixth lengths.

9. The triboelectric generator of claim 1 wherein the second electrode is formed by the second housing wall.

10. The triboelectric generator of claim 1 wherein at least one of the first and second housing walls is structured and positioned for application of an external load thereto, for operating the triboelectric generator.

11. A triboelectric generator network comprising a plurality of triboelectric generators in accordance with claim 1.

12. A power generating system comprising a plurality of contiguous hexagonal triboelectric generators, wherein each triboelectric generator of the plurality of contiguous hexagonal triboelectric generators has a hexagonal housing including a first housing wall and a second housing wall positioned opposite the first housing wall, and wherein at least one first housing wall and at least one second housing wall of the plurality of contiguous hexagonal triboelectric generators are structured and positioned to function as load application walls through which a force is applied to the plurality of contiguous hexagonal triboelectric generators to operate at least a portion of the triboelectric generators of the plurality of contiguous hexagonal triboelectric generators.

13. The power generating system of claim 12 wherein the plurality of contiguous hexagonal triboelectric generators comprise a plurality of contiguous hexagonal housings, and wherein the plurality of contiguous hexagonal housings is formed by an aluminum honeycomb structure.

14. The power generating system of claim 12 wherein the plurality of contiguous hexagonal triboelectric generators comprises a network of contiguous hexagonal triboelectric generator housings, each housing of the network of contiguous hexagonal triboelectric generator housings being structured to be resiliently deformable responsive to an external force applied to the network so as to enable relative movement of a dielectric and an electrode positioned in the housing in directions toward and away from each other, and so as to enable contact between the dielectric and the electrode positioned in the housing, and wherein the power generating system is structured to generate a quasi-sinusoidal output responsive to a low frequency external force applied to the network of contiguous hexagonal triboelectric generator housings.

15. A triboelectric generator comprising:
an electrically-conductive hexagonal housing including a first housing wall and a second housing wall positioned opposite the first housing wall, the second housing wall forming an electrode of the triboelectric generator;
another electrode positioned along the first housing wall; and
a dielectric contact layer positioned in intimate contact with the other electrode and between the other electrode and the second housing wall, the dielectric contact layer being spaced apart from the second housing wall electrode,
wherein the housing is structured to be resiliently-deformable responsive to relative movement between the first housing wall and the second housing wall, so as to enable contact between the dielectric contact layer and the second housing wall for operation of the triboelectric generator.

* * * * *